United States Patent
van der Laan

(10) Patent No.: US 9,755,329 B2
(45) Date of Patent: Sep. 5, 2017

(54) SUPERCONDUCTING CABLE CONNECTIONS AND METHODS

(71) Applicant: Advanced Conductor Technologies LLC, Boulder, CO (US)

(72) Inventor: Daniël Cornelis van der Laan, Boulder, CO (US)

(73) Assignee: Advanced Conductor Technologies LLC, Boulder, CO (US)

( * ) Notice: Subject to any disclaimer, the term of this patent is extended or adjusted under 35 U.S.C. 154(b) by 681 days.

(21) Appl. No.: 14/302,194

(22) Filed: Jun. 11, 2014

(65) Prior Publication Data
US 2016/0352027 A1 Dec. 1, 2016

Related U.S. Application Data

(60) Provisional application No. 61/835,472, filed on Jun. 14, 2013.

(51) Int. Cl.
*H01R 9/05* (2006.01)
*H02G 15/04* (2006.01)
(Continued)

(52) U.S. Cl.
CPC ............ *H01R 9/0509* (2013.01); *H01B 12/02* (2013.01); *H01R 4/68* (2013.01); *H01R 43/02* (2013.01);
(Continued)

(58) Field of Classification Search
CPC .......... H01R 9/05; H01R 43/20; H01R 43/02; H01R 9/0509; H02G 15/04; H02G 15/00;
(Continued)

(56) References Cited

U.S. PATENT DOCUMENTS

| 4,797,510 A | 1/1989 | Mihelich |
| 7,531,750 B2 * | 5/2009 | Kellers ................... H01R 4/68 174/125.1 |

(Continued)

FOREIGN PATENT DOCUMENTS

| EP | 1 289 067 | 3/2003 |
| EP | 1 453 142 | 9/2004 |

(Continued)

OTHER PUBLICATIONS

International Search Report and Written Opinion dated Aug. 8, 2013, from related international application No. PCT/US2012/042110.

*Primary Examiner* — Gary Paumen
(74) *Attorney, Agent, or Firm* — Foley & Lardner LLP

(57) ABSTRACT

Superconducting cable connector structures include a terminal body (or other structure) onto which the tapes from the superconducting cable extend. The terminal body (or other structure) has a diameter that is sufficiently larger than the diameter of the former of the superconducting cable, so that the tapes spread out over the outer surface of the terminal body. As a result, gaps are formed between tapes on the terminal body (or other structure). Those gaps are filled with solder (or other suitable flowable conductive material), to provide a current path of relatively high conductivity in the radial direction. Other connector structures omit the terminal body.

35 Claims, 9 Drawing Sheets

(51) Int. Cl.
    *H01B 12/02*     (2006.01)
    *H01R 4/68*     (2006.01)
    *H02G 15/34*     (2006.01)
    *H01R 43/02*     (2006.01)
    *H01R 43/20*     (2006.01)
    *H02G 15/00*     (2006.01)
    *H02G 15/08*     (2006.01)
    *H01R 4/02*     (2006.01)

(52) U.S. Cl.
    CPC ........... *H01R 43/20* (2013.01); *H02G 15/003* (2013.01); *H02G 15/046* (2013.01); *H02G 15/08* (2013.01); *H02G 15/34* (2013.01); *H01R 4/023* (2013.01); *H01R 4/027* (2013.01); *Y02E 40/648* (2013.01)

(58) Field of Classification Search
    CPC .... H02G 15/08; H02G 15/003; H02G 15/046; H01B 12/02
    USPC ............. 505/230, 150, 234, 433; 174/125.1; 29/599
    See application file for complete search history.

(56) References Cited

U.S. PATENT DOCUMENTS

| | | | |
|---|---|---|---|
| 9,590,409 B2* | 3/2017 | Faulkner | H02G 15/08 |
| 2012/0015816 A1 | 1/2012 | Yagi et al. | |
| 2012/0181082 A1* | 7/2012 | Faulkner | H02G 1/08 |
| | | | 174/75 R |
| 2012/0214675 A1 | 8/2012 | Van Der Laan | |
| 2015/0018221 A1* | 1/2015 | van der Laan | H01B 12/02 |
| | | | 505/230 |

FOREIGN PATENT DOCUMENTS

| | | |
|---|---|---|
| EP | 1 667 283 | 6/2006 |
| EP | 2 565 987 | 3/2013 |

* cited by examiner

SUPERCONDUCTING CABLE CONNECTIONS AND METHODS

GOVERNMENT RIGHTS

This application claims priority from Provisional U.S. Application 61/835,472 filed Jun. 14, 2013, incorporated herein by reference in its entirety.

GOVERNMENT RIGHTS

This invention was made with government support under grant numbers DE-SC0007660, DE-SC0009545 and DE-SC0009485 awarded by the U.S. Department of Energy, and grant number FA8650-12-M-2254 awarded by the U.S. Air Force Research Laboratory. The government has certain rights in the invention.

FIELD OF THE INVENTION

Embodiments of the present invention relate to superconducting cable connections, connector structures for superconducting cables, cables that include such connector structures and methods of making and using the same. Particular embodiments relate to such connections, connector structures, and cables that include a terminal body (or other structure) onto which the tapes from the superconducting cable extend, where the terminal body (or other structure) has a diameter that is sufficiently larger than the diameter of the former of the superconducting cable, so that the tapes spread out over the outer surface of the terminal body to form gaps that are filled with solder (or other suitable flowable conductive material), to provide a current path of relatively high conductivity in the radial direction, between resistive buffer layers of the tapes. Other embodiments employ other structures that do not include a terminal body, but where current can flow directly outward.

BACKGROUND

Certain superconducting cables have been formed with superconducting tapes that are wound into multiple layers, in a helical fashion, around a former. In certain contexts, it may be desirable to connect and/or disconnect two of such superconducting cables together, or connect and/or disconnect a superconducting cable to a non-superconducting current lead. Embodiments of the present invention relate to connections, connector structures and methods that provide a connection between two superconducting cables, or a superconducting cable and a current lead that has a relatively low electrical resistance and that can potentially connect and disconnect many times.

Superconducting cables, such as Conductor on Round Core (CORC) cables, may contain as many as 50 or more high-temperature superconducting tapes that are wound in as many as 20, or more layers on a round former. The diameter of the former can be as small as 3 mm, or smaller. Some of the superconducting tapes, as $RE-Ba_2Cu_3O_{7-\delta}$ (REBCO) (RE=rare earth: Y, Dy, Gd, etc) coated conductors contain a superconducting film that is located on one side of a metal substrate, with one or more resistive barrier layers between the superconducting film and the substrate. In such configurations, current can only enter and exit the superconducting film from one side of the tape, following a current path with low resistance.

Some superconducting cables, such as CORC cables, are constructed by winding some or all of the superconducting tapes with their superconducting layer on the inside, facing the former. In such configurations, it may be difficult to inject or extract current from the cables, because the electrical conductivity in the radial direction is reduced by the presence of the resistive buffer layers in some or all of the tapes.

DETAILED DESCRIPTION

Embodiments of the present invention relate to superconducting cable connections and connector structures for superconducting cables. Embodiments of the present invention also relate to cables that include such connector structures and methods of making and using the same. Particular embodiments relate to connector structures for superconducting cables that have a plurality of superconducting tapes helically wound in one or more layers on a former of relatively small diameter.

Connector structures described herein are configured to connect two superconducting cables together, or to connect one superconducting cable with a non-superconducting current lead. In particular embodiments, the connector structures and methods provide a low resistance connection between two superconducting cables, or between a superconducting cable and a current lead. The superconducting cable(s) may contain one or more superconducting tapes in one or more layers wound around a relatively small-diameter former, with the superconducting layer of some or all of the tapes on the inside of the wind. Superconducting tapes can have a relatively high electrical resistivity in the direction normal to their longitudinal length dimensions. In particular embodiments, the superconducting cable(s) contain many (from 3 to 80 or more) superconducting tapes, wound in many (from 2 to 20 or more) layers on a relatively small-diameter former (for example, 10 mm. diameter or smaller). Other embodiments employ larger diameter formers.

Connector structures according to certain embodiments described herein include a terminal body onto which the tapes in the cable extend. The terminal body has a diameter that is sufficiently larger than the diameter of the former, so that the tapes spread out over the outer surface of the terminal body. As a result, gaps are formed or widened between the tapes on the terminal body. These gaps are filled with solder (or other suitable flowable conductive material), to provide a current path of relatively high conductivity in the radial direction, between resistive buffer layers of the tapes. Connector structures according to other embodiments described herein have no terminal bodies, or have terminal bodies that are about the same or slightly larger in diameter than the former.

In particular embodiments, gaps are formed between the resistive buffer layers of adjacent tapes, by surrounding or plating the tapes with conductive material before the tapes are wound into a cable. The conductive layer may comprise copper, solder or other suitable electrically conductive material having a predefined resistivity.

Figure 1:
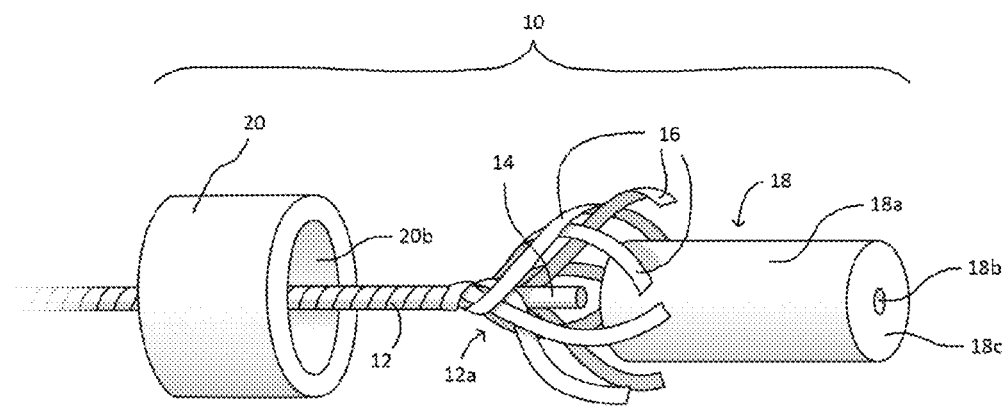
FIG. 1 is a partially exploded view of a male connector according to an embodiment of the present invention.
Figure 2:
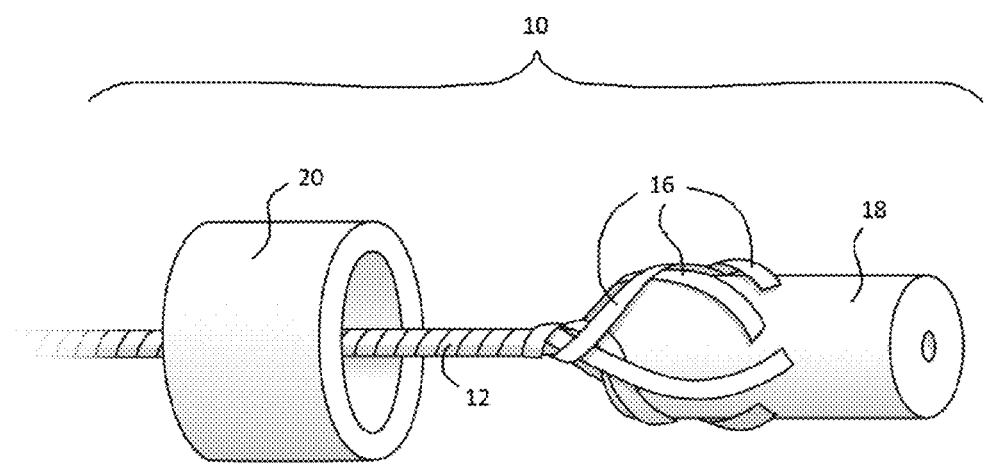
FIG. 2 is a further, partially exploded view of the male connector of FIG. 1, with the superconducting cable coupled to the inner insert.
Figure 3:
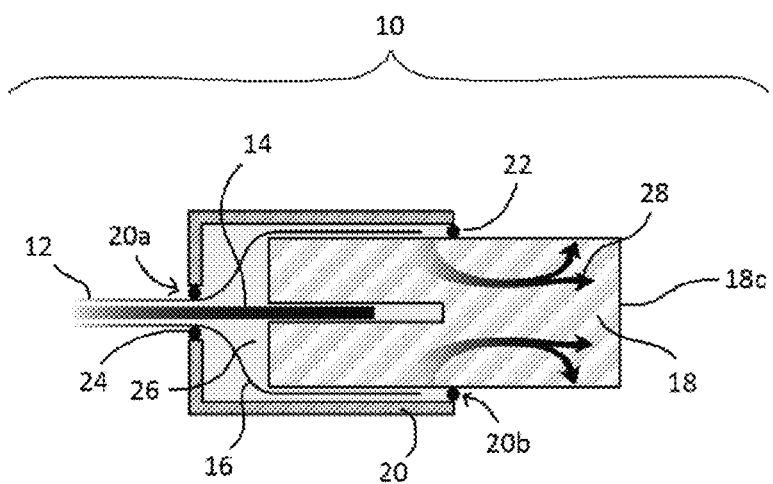
FIG. 3 is a side, cross-section view of the male connector of FIG. 1, in an assembled state.

A connector structure according to an embodiment of the present invention is described with reference to FIGS. 1-3. The drawings of FIGS. 1-3 show a male connector structure 10 for a superconducting cable 12. The superconducting cable 12 contains a plurality of superconducting tapes 16 wound in a helical manner around a former 14. In particular embodiments, the superconducting cable 12 is a Conductor on Round Core (CORC) cable that contains many (e.g., up to 50, or more) high-temperature superconducting tapes that are wound in many (e.g., up to 20, or more) layers on a former having a circular (round) cross-section shape.

The former 14 is composed of any suitable material having sufficient rigidity and strength to support the tapes 16 and, in certain embodiments, sufficient flexibility to allow the cable 12 to bend. In particular embodiments, the former 14 is made of an electrically conductive material. In other embodiments, the former 14 is made of an electrically insulating material. Examples of suitable materials for the former 14 include, but are not limited to: stranded or solid copper, carbon fiber, stainless steel, or aluminum. In particular embodiments, the former 14 is formed in a generally cylindrical shape and has a relatively small maximum diameter, for example, 10 mm or less (or, in further embodiments, 3 mm or less). In other embodiments, the former 14 has a maximum diameter that is greater than 10 mm. In particular embodiments, the former 14 has a circular cross-section. In other embodiments, the former 14 has a cross section that is not circular, such as, but not limited to, oval, polygonal, or more complex shaped.

Each superconducting tape 16 has a longitudinal length dimension that is longer than its width and thickness dimensions. The superconducting tapes 16 may be wound in their longitudinal length dimension, on the former 14 in a single layer, or in a plurality of layers. In FIG. 1, the superconducting tapes 16 are helically wound in a plurality of layers on the former 14.

In particular embodiments, each superconducting tape 16 has substrate layer and one or more layers of superconducting material. Any suitable superconducting material may be employed for the superconducting layer(s), including, but not limited to RE-Ba$_2$Cu$_3$O$_{7-\delta}$ (REBCO) (RE is rare earth: Y, Dy, Gd, or other suitable rare earth materials). In other embodiments, other suitable superconducting materials may be employed for the one or more superconducting layers.

The superconducting layer(s) are supported on one surface of the substrate layer directly or with one or more layers of other material(s) between them. In particular embodiments, one or more resistive barrier layers is provided between the superconducting layer and the substrate in each superconducting tape 16. Each superconducting tape 16 is wound around the former 14, with the superconducting layer(s) on the inside of the wind (facing the former 14). In other embodiments, one or more of the superconducting tapes 16 are wound with the superconducting layer(s) on the outside of the wind (facing away from the former 14).

The connector structure 10 is attached to an end portion 12a of the superconducting cable 12, and includes a terminal body 18 and a shell 20 (also referred to herein as an outer cap 20). The terminal body 18 is arranged at an end portion of the former 14 and at end portions of the superconducting tapes 16 (at the end portion 12a of the cable 12). During assembly of the connector structure 10, the outer cap 20 is arranged, in a position to cover at least a portion of the terminal body 18 (as shown in FIG. 3).

The terminal body 18 has an outer surface 18a onto which the end portions of the superconducting tapes 16 extend. In the illustrated embodiment, the terminal body 18 has a generally cylindrical shape, with a circular cross-section shape. In other embodiments, the terminal body 18 has other suitable cross-section shapes, including but not limited to conical shapes and/or may tapered toward one or both ends and/or tapered toward a central portion of the terminal body. The terminal body 18 may be made of any suitable material having sufficient rigidity, strength and electrical conductivity, to support the superconducting tapes 16 and conduct electrical current in the manner described herein, such as, but not limited to metal, conductive ceramic, conductive composite material, or the like. In particular embodiments, the terminal body 18 is made of a superconducting material or includes one or more layers (such as, but not limited to, outer layers) of superconducting material, so that the terminal body 18, itself, has superconducting characteristics.

The terminal body 18 (or at least a portion of the outer surface 18a) has a diameter that is sufficiently larger than the diameter of the former 14, so that the superconducting tapes spread out over the outer surface of the terminal body 18 (relative to the spacing of the tapes 16 on the cable 12). In particular embodiments, in each layer of the superconducting cable 12, the superconducting tapes 16 are wound with little or no spacing between adjacent winds. However, at the end portion 12a of the cable 12, the superconducting tapes 16 transfer from the outer surface of the former 14 to the outer surface 18a of the terminal body 18. As shown in FIG. 1, the end portions of the superconducting tapes 16 spiral outward from the former 14 and spread out relative to each other, to wrap around a portion of the outer surface 18a. As shown in FIG. 2, the end portions of the superconducting tapes wrap at least partially around the outer surface 18a of the terminal body 18, and are attached to the outer surface 18a of the terminal body 18 by solder or other suitable adhesive material.

As a result of the end portions of the superconducting tapes 16 spreading out over the outer surface 18a of the terminal body 18, gaps are provided between the tapes on the outer surface 18a. In particular embodiments, solder or other flowable conductive material is provided in the gaps between the tapes on the outer surface 18. The conductive material in the gaps provides a current path of relatively high conductivity in the radial direction, between resistive buffer layers of the tapes.

In particular embodiments, the terminal body 18 attaches to an end portion of the former 14 of the superconducting cable 12. In the embodiment of FIGS. 1-3, the terminal body 18 has an central channel 18b, in which an end portion of the former 14 extends (as shown in FIG. 3). The central channel 18b may extend from one end of the terminal body 18 toward the other end of the terminal body and may terminate in a central portion of the terminal body 18 (as shown in FIG. 3) or, alternatively, may extend all of the way through the terminal body 18 (as shown in FIG. 1). The end portion of the former 14 is secured to the terminal body 18 in any suitable manner, including, but not limited to solder or other adhesive material within the channel 18c, friction fitting of the former 14 within the channel 18c, clamps, set screws or other suitable attaching mechanisms. In further embodiments, the former is fitted loosely in the channel.

The outer cap 20 is arranged over at least a portion of the terminal body 18, as shown in FIG. 3. The outer cap 20 has an interior volume that receives at least a portion of the terminal body 18. In the embodiment of FIGS. 1-3, a portion (the left-side portion in FIG. 3) of the terminal body 18 is contained inside the interior volume of the outer cap 20, while a further portion (the right-side portion in FIG. 3) of the terminal body 18 extends outside of the outer cap 20. The outer cap 20 has a first end with an opening 20a into the interior volume, through which the superconducting cable 12 extends. The outer cap 20 has a second end with an opening 20b into the interior volume, through which the further portion of the terminal body extends, as discussed above.

The outer cap 20 in the embodiment of FIGS. 1-3 is a generally cup-shaped member that has a generally cylindrical outer shape, and a generally cylindrical interior volume defined by an interior surface. In other embodiments, the outer cap 20 may be generally cylindrical and open on each end (instead of cup-shaped). The interior volume of the outer cap 20 has a shape and size sufficient to receive a portion of the terminal body 18 and the end portions of the superconducting tapes 16 attached thereto. The interior surface of the outer cap 20 has a shape that matches the shape of the outer surface 18a of the portion of the terminal body 18 received within the outer cap 20. In other embodiments, the outer cap 20 has another suitable shape and/or has an interior surface that does not match the shape of the terminal body 18. The outer cap 20 may be made of any suitable material having sufficient rigidity, strength and electrical characteristics to operate in the manner described herein, such as, but not limited to metal, plastic, rubber, ceramic, composite material, or combinations thereof. In other embodiments, the outer cap is composed of multiple parts, such as two halves that are connected together, or containing a cap that encloses the cable.

The connector structure 10 include one or more seals 22 around the opening 20b and one or more seals 24 around the opening 20a. In other embodiments, one or both seals 22 and 24 may be omitted. The seals 22 and 24 help to seal the interior volume of the outer cap 20 relative to the environment external to the outer cap 20. In particular embodiments, the seals 22 and 24 can provide a barrier to inhibit materials inside of the outer cap 20 (such as solder) from leaking out of the outer cap, and/or to inhibit contaminants or other materials in the environment outside of the outer cap 20 from entering the interior volume of the outer cap 20.

The seal(s) 22 provide a seal between the outer cap 20 and the terminal body 18. In particular embodiments, each seal 22 is attached to, or is part of the outer cap 20 and extends toward and contacts the outer surface 18a of the terminal body 18. In other embodiments, each seal 22 is attached to, or is part of the terminal body 18 and extends outward and contacts a surface of the outer cap 20 (such as the inner surface of the outer cap 20). In yet other embodiments, one or more seals 22 are attached to, or are part of the outer cap 20 and another one or more seals 22 are attached to, or could be part of the terminal body 18. One or both of the terminal body 18 and the outer cap 20 may include one or more grooves or recesses (not shown) in which a seal 22 resides. Each seal 22 may include any suitable seal configuration, such as, but not limited to an o-ring configuration, a cylindrical configuration, a flowable material that sets or hardens into any suitable shape within the gap between the outer cap 20 and the terminal body, a press fit, or the like. Each seal 22 may be made of any suitable material, including, but not limited to rubber, plastic, metal, ceramic, composite material, or combinations thereof.

The seal(s) 24 provide a seal between the outer cap 20 and the superconducting cable 12. In particular embodiments, each seal 24 is attached to the outer cap 20 and extends toward and contacts the outer surface (for example, an outer sheath or other outer layer) of the superconducting cable 12. In other embodiments, each seal 24 is attached to the outer surface (for example, an outer sheath or other outer layer) of the superconducting cable 12 and extends outward and contacts a surface of the outer cap 20 (such as the inner surface of the opening 20a in the outer cap 20). In yet other embodiments, one or more seals 24 are attached to the outer cap 20 and another one or more seals 24 are attached to the superconducting cable 12. One or both of the superconducting cable 12 and the outer cap 20 may include one or more grooves or recesses (not shown) in which a seal 24 resides. Each seal 24 may include any suitable seal configuration, such as, but not limited to an o-ring configuration, a cylindrical configuration, a flowable material that sets or hardens into any suitable shape within the gap between the outer cap 20 and the superconducting cable 12, a press fit, or the like. Each seal 24 may be made of any suitable material, including, but not limited to rubber, plastic, metal, ceramic, composite material, or combinations thereof.

After the terminal body 18 is received within the interior volume of the outer cap 20, the portion of the interior volume of the outer cap 20 that is between the terminal body 18 and the inner surface of the outer cap 20 (or between the superconducting tapes 16 and the inner surface of the outer cap 20 or the terminal body 18) is filled with solder 26 or other selectively flowable electrically conductive material (or, alternatively, an electrically insulating material). The solder 26 (or other selectively flowable material) helps to rigidly secure the superconducting tapes 16 and the terminal body 18 within the outer cap 20.

Embodiments of the male connector structure 10 described herein may be made according to any suitable process. An example embodiment of a process for making a male connector structure 10 includes obtaining a superconducting cable 12, a terminal body 18 and an outer cap 20. The superconducting cable 12 may be obtained from any suitable source of superconducting cables and/or may be made by helically winding superconducting tapes 16 around a former 14, in one or more layers. The terminal body 18 may be obtained from any suitable source and/or by molding, casting, cutting, machining and/or otherwise forming the body 18 into the desired shape from the desired material. The outer cap 20 may be obtained from any suitable source and/or by molding, casting, cutting, machining and/or otherwise forming the outer cap 20 into the desired shape from the desired material. In particular embodiments, seals 22 and 24 are attached to the outer cap 20.

The outer cap 20, with the seals 22 and 24, is placed over a portion of the superconducting cable 12 spaced from the end portion 12a. For example, the end portion 12a of the superconducting cable 12 can be passed through the opening 20a and then through the opening 20b, so as to extend through and then out of the outer cap 20, as shown in FIGS. 1 and 2. Alternatively, the opposite end (not shown in the drawings) of the superconducting cable 12 can be passed through the opening 20b and then through the opening 20a, so as to extend through the outer cap 20 and leave the end portion 12a outside of the outer cap 20, as shown in FIGS. 1 and 2.

The end portions of the superconducting tapes 16 (at the end portion 12a of the superconducting cable 12) are partially unwound (or otherwise spiraled outward) from the former 14 (as shown in FIG. 1), and are attached to, or placed loosely on the outer surface 18a of the terminal body 18 (as shown in FIG. 2). In particular embodiments, the end portions of the superconducting tapes 16 are unwound from the former 14, after the outer cap 20 has been placed over a portion of the superconducting cable 12, as shown in FIG. 1.

In addition, the end portion of the former 14 (at the end portion 12a of the superconducting cable 12) is attached to, or placed loosely in the terminal body 18. In particular embodiments, the end portion of the former 14 is received in the channel 18c of the terminal body and attaches to the terminal body 18, at the channel 18c. In other embodiments, the former 14 is attached to the terminal body 18 in another suitable manner.

The outer cap 20 is then placed over at least a portion of the terminal body 18. For example, the outer cap 20, previously having been placed over the superconducting cable 12, can be moved along the superconducting cable 12 toward the end portion 12a, until the terminal body 18 is received a sufficient distance into the opening 20b of the outer cap 20. In particular embodiments, when the outer cap 20 is placed over the terminal body 18, the end portions of the superconducting tapes 16 that have been unwound or otherwise spiraled outward from the former 14 are confined in a gap (volume) formed between one end of the terminal body 18 (i.e., the end in which the former is inserted or attaches) and one end of the outer cap 20 (i.e., the end in which opening 20a is provided). The gap (volume) between the end of the terminal body 18 and the end of the outer cap 20 may be made relatively small but, in particular embodiments, is configured to be large enough to allow the superconducting tapes 16 to extend outward (e.g., expand their winding diameter, freely, from their natural unwinding spring tension) as they extend from the former 14 to the outer surface 18a of the terminal body 18.

Then, the gap (volume) between the end of the terminal body 18 and the end of the outer cap 20, and any further gap between the outer surface 18a of the terminal body 18 and the inner surface of the outer cap 20 is filled with solder 26 (or other selectively flowable material). In particular embodiments, the solder 26 (or other selectively flowable material) is injected or otherwise flowed into the gap (volume), through one or more holes (not shown) in the outer cap 20 and/or in the terminal body 18 that lead into the gap (volume) within the outer cap 20. In further embodiments, the solder 26 (or other selectively flowable material) may be provided inside of the outer cap 20, before or after assembly with the terminal body 18, and then heated to flow after the terminal body 18 is inserted into the outer cap 20. In such embodiments, the terminal body 18 may be configured to conduct heat from a heat source (such as, but not limited to a heater device formed in a cartridge that inserts into an open end of the channel 18b or other hole in the terminal body 18), to cause the solder (or other selectively flowable material) to flow within the interior volume of the outer cap 20. Once the solder (or other selectively folowable material) has sufficiently flowed into and filled the gap (volume) within the outer cap 20, the heat source may be removed from the terminal body 18, to allow the solder (or other selectively flowable material to set or harden.

The solder (or other selectively flowable material) connects the superconducting tapes 16 to each other and in some embodiments to the outer cap 20 and/or to the terminal body 18. In particular embodiments, the solder (or other selectively flowable material) is sufficiently electrically conductive, to provide low-resistive current paths from the superconducting film on the superconducting tapes 16 to the terminal body 18. The resulting male connector structure 10 connects with a superconducting cable 12 and is configured to provide sufficiently low resistant current flow paths 28 from superconducting tapes 16 of the superconducting cable 12, through the terminal body 18. Furthermore the male connector structure 10 may be configured to connect to superconducting cable having a plurality of superconducting tapes 16 wound around a relatively small-diameter former 14.

Figure 4:
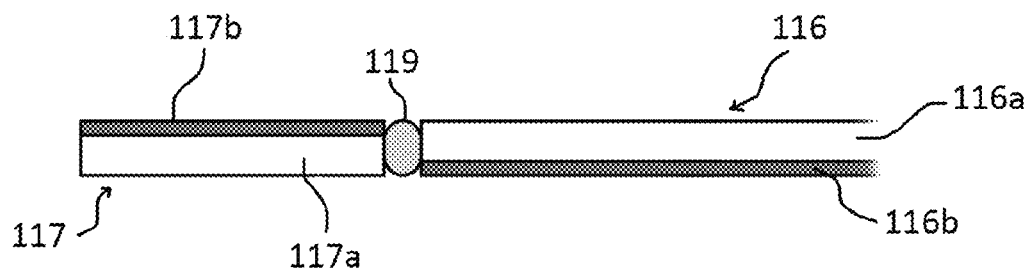
FIG. 4 is a side view of a portion of a superconducting tape and connecting tape of the embodiment of FIG. 5.

A male connector structure 110 according to another embodiment of the present invention is described with reference to FIGS. 4 and 5. The male connector structure 110 is configured to connect to a superconducting cable 112 having superconducting tapes 116 wound around a former 114. The superconducting cable 112, former 114 and superconducting tapes 116 are configured in the same manner as described above with respect to superconducting cable 12, former 14 and tapes 16. However, in the embodiment of FIGS. 4 and 5, a connecting tape 117 is attached to the end of each superconducting tape 116.

In particular, each superconducting tape 116 has a substrate layer 116a and one or more layers of superconducting material 116b. One or more layers of other material (such as, but not limited to electrically resistive material to form a resistive barrier layer) may be provided between the superconducting material layer(s) 116b and the substrate layer 116a. In particular embodiments, each superconducting tape 116 is wound around the former 114, with the layer(s) of superconducting material 116b on the inside of the winding, facing toward the former (i.e., arranged between the former 114 and the substrate layer 116a of the tape). However, the end portion of each superconducting tape 116 is coupled to a connecting tape 117.

The connecting tape 117 has a substrate layer 117a and a superconducting layer 117b arranged to face in directions opposite to the directions in which the substrate layer 116a and the superconducting layer 116b of the superconducting tape 116 face. Thus, in FIG. 4, an end portion of the superconducting tape 116 has a substrate layer 116a facing upward (on the top of the drawing) and a superconducting layer 116b facing downward (on the bottom of the drawing), while the connecting tape 117 has a substrate layer 117a facing downward (on the bottom of the drawing) and a superconducting layer 117b facing upward (on the top of the drawing). The connector tape 117 is electrically connected to an end portion of the superconducting tape 116 by any suitable mechanism, including, but not limited to, solder, other selectively flowable material, epoxy, glue, or the like. In the embodiment of FIG. 4, that connection is made through a butt joint (or end-to-end) connection, where an end of the connecting tape 117 is attached to an end of the superconducting tape 116 with a solder bead 119. In further embodiments, a connection can be formed through a lap joint in which both tapes partly overlap.

The male connector structure 110 includes a terminal body 118 located within an outer cap 120. The terminal body 118 and the outer cap 120 are configured in the same manner and shape, and are made of the same materials as in the examples described above with respect to the terminal body 18 and the outer cap 20. In one embodiment, the outer cap 120 in FIG. 5 has one opening 120a through which the superconducting cable 116 extends (corresponding to the above-described opening 20a in FIG. 3), but does not include a second opening corresponding to opening 20b in FIG. 3. Accordingly, the outer cap 120 fully encloses the terminal body 118 and the end portion of the superconducting cable 112, except for the opening 120a through which the superconducting cable 112 extends. One or more seals 124 (similar to the seals 24 described above) may be arranged in the opening 120a, in a manner similar to the arrangement of the seal(s) 24 in the opening 20a, described above. In another embodiment, the outer cap 120 is not closed but contains an opening similar to that of 20b in FIG. 3. In such embodiments, the terminal body 118 extends through the opening and a seal may enclose the space between 118 and 120.

The former 114 connects to the terminal body 118 in a manner similar to the manner in which former 14 connects to the terminal body 18, described above. However, in particular embodiments, the former 114 is attached to terminal body 118, before the superconducting tapes 116 are wound onto the former 114. In particular embodiments, the superconducting tapes 116 are wound around the former 114, with their superconducting layers 116b facing inward of the wind (facing toward the former), but connect to connecting tapes 117 that have oppositely directed superconducting layers 117b.

The superconducting tapes 116 and connecting tapes 117 are attached to, or placed loosely on the outer surface of the terminal body 118 (in a manner similar to the attachment of the tapes 16 to the terminal body 18, described above). However, the superconducting layers on the connecting tapes 117 face outward, when the tapes 117 are attached to the terminal body 118. In particular embodiments, the terminal body 118 has an outer diameter that is sufficiently larger than the outer diameter of the former 114, so that the superconducting tapes 116 (and the connecting tapes 117) spread outward and form gaps between tapes on the terminal body 118, as described above with respect to the tapes 116 on the terminal body 18. Solder 126 or other selectively flowable material (similar to material 26 described above) is provided within the interior volume of the outer cap 120, to help rigidly secure the superconducting tapes 116, connector tapes 117 and the terminal body 118 within the outer cap 120.

Figure 5:
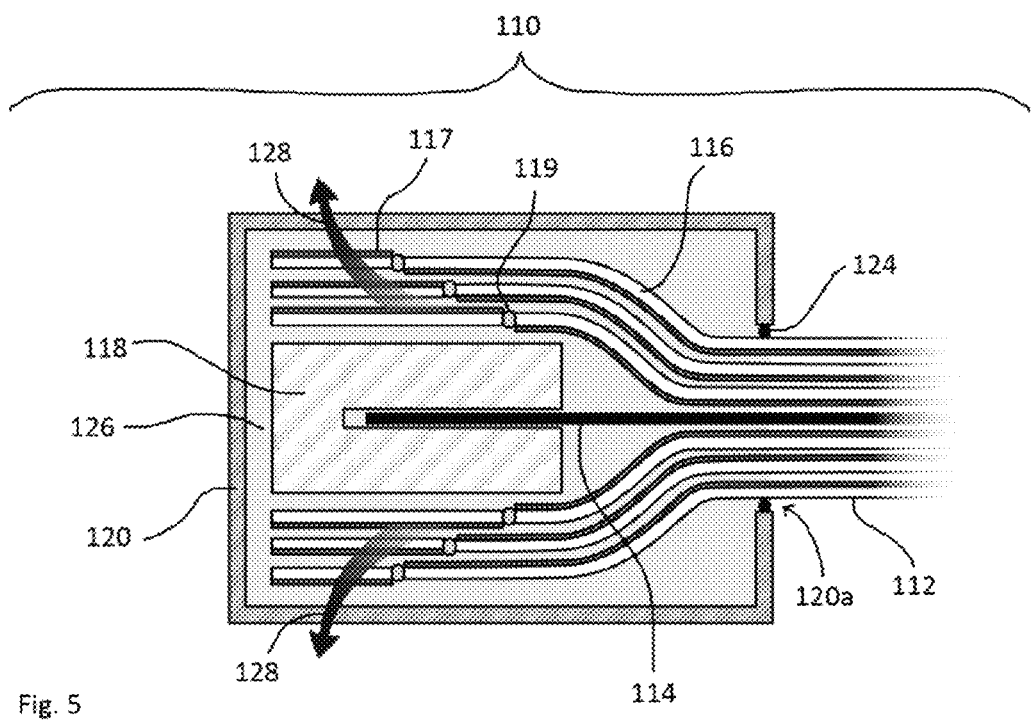
FIG. 5 is a side, cross-section view of a male connector according to a further embodiment of the present invention.

A male connector structure 110 as shown in FIG. 5 may be made in accordance with any suitable process. An example embodiment of a process for making a male connector structure 110 includes obtaining a former 114, superconducting tapes 116, a terminal body 118 and an outer cap 120. In particular embodiments, the former 114 is for a Conductor on Round Core (CORC) cable. In further embodiments, other suitable formers 114 may be employed, including other formers as described above with respect to former 14.

The superconducting tapes 116 may be obtained from any suitable source and may be the type described above with respect to superconducting tapes 16. In certain embodiments, the superconducting tapes 116 and the former 114 are obtained, by obtaining a superconducting cable 112 and at least partially unwinding the end portions of the superconducting tapes to expose an end portion of the former. The exposed end portion of the former 114 is, then, attached to the terminal body 118. In other embodiments, the process of making the connector structure 110 includes obtaining a former 114 with no superconducting tapes 116 wound thereon, attaching the former 114 to the terminal body 118 and, then, winding the superconducting tapes 116 onto the former after the former is attached to the terminal body 118.

The superconducting tapes 116 are wound on the former 114, with the superconducting layer(s) 116b directed toward the inside of the wind (facing toward the former 114). In other embodiments, the superconducting tapes 116 are wound with the superconducting layer(s) 116b on the outside of the wind (facing away from the former 114). In yet other embodiments, one or more of the superconducting tapes 116 are wound around the former 114 with the superconducting layer(s) 116b on the outside of the wind and one or more other superconducting tapes 116 are wound around the same former 114 with their superconducting layer(s) on the inside of the wind.

A respective connector tape 117 is attached to an end portion of each respective superconducting tape 116 in any suitable manner as described above. In particular embodiments, the connector tapes 117 are attached to the end portions of the superconducting tapes 116, before the superconducting tapes 116 are wound on the former 114. In other embodiments, the connector tapes 117 are attached to end portions of superconducting tapes 116 that were initially wound around the former and, then, at least partially unwound from the former 114. In particular embodiments, solder or other selectively flowable, electrically conductive material is provided on one of (or is arranged between) an end of each superconducting tape 116 and an end of a respective connector tape 117. The two tape ends are brought together and adhered to one another by the solder (or other flowable material) to form a butt joint between the tapes (e.g., the solder joint 19). This joint will have a relatively high resistance because the superconducting films in both tapes are not in direct electrical contact with each other. In further embodiments, the tape connection joint for the two tape ends includes a low resistance joint structure, such as a lap joint.

The terminal body 118 may be obtained from any suitable source or made in accordance with any of the processes described above for making terminal body 18. The former 114 is attached to the terminal body 118 in any suitable manner, such as those described above for attaching former 14 to terminal body 18. In the embodiment of FIG. 5, an end portion of the former 114 is extended into a channel in the terminal body 118 and is attached to, or loosely inserted into the terminal body 118 within the channel. In embodiments in which the former 114 without superconducting tapes is obtained and attached to the terminal body 118, the superconducting tapes 116 (with the connector tapes 117 attached thereto) are wound onto the former after the former is attached to, or inserted into the terminal body 118.

In particular embodiments, the terminal body 118 has an outer surface onto which the end portions of the superconducting tapes 116 extend and attach, or lay loosely on, for example, in a manner similar to the manner in which the superconducting tapes 16 extend over and attach to, or lay loosely on the terminal body 18 described above. The maximum outer diameter of the terminal body 118 is sufficiently greater than the outer diameter of the former 114, to allow the end portions of the superconducting tapes 116 and the attached connector tapes 117 to spread out over the outer surface of the terminal body 118, as described above with respect to superconducting tapes 16 and terminal body 18. As a result, gaps are provided, or extended between the end portions of the superconducting tapes 116 and between connector tapes 117 on the outer surface of the terminal body 118. In particular embodiments, solder or other flowable conductive material is, then, added into those gaps and provides a current path of relatively high conductivity in the radial direction, between resistive buffer layers of the tapes.

In particular embodiments, the connector tapes 117 are arranged on the terminal body 118, with their superconducting layers 117b facing away from the terminal body 118 (and with their substrate layers 117a facing toward and partly in contact with the terminal body 118). In such embodiments, the winding or partial winding of those connector tapes 117 over the outer surface of the terminal body 118 imparts a tension on the superconducting layers(s) 117b. Accordingly, in particular embodiments, the portion of the terminal body 118 onto which the connector tapes 117 are arranged has an outer diameter that is large enough to sufficiently minimize the tension on the superconducting layer(s) 117b, to avoid damage to the superconducting layer(s) 117b.

In further particular embodiments, the joints 119 connecting the connector tapes 117 to the end portions of the superconducting tapes 116 are staggered relative to each other, along the outer surface of the terminal body 118. In this manner, the joints 119 are laterally spaced from each other (and are not stacked onto one another) on the outer surface of the terminal body 118. In the embodiment of FIG. 5, the joints 119 are staggered, by arranging the joints 119 on superconducting tapes 116 that are in each higher layer in the cable 112 at locations further down the longitudinal length of the terminal body 118, than the joints 119 on superconducting tapes 116 that are in lower layers in the cable 112. In such arrangements, a portion of the superconducting layer(s) of a superconducting tape 116 in each upper layer is in direct contact with a portion of the superconducting layer(s) of the connector tape 117 in the adjacent lower layer. Furthermore, the superconducting layer(s) of the superconducting tape(s) 116 in the lower layer(s) are in direct contact with the outer surface of the terminal body 118. Accordingly, direct contact connections are made between superconducting layers in each adjacent layer and between the lowermost layer and the terminal body 118.

In other embodiments, other arrangements of staggered joints 119 may be employed. In further embodiments, two or more joints 119 are stacked (one on top of the other) on the outer surface of the terminal body 118. In the embodiment of FIG. 5, the connector tapes 117 on superconducting tapes 116 of different layers have different lengths. For example, the length of the connector tape 117 on the superconducting tape 116 of the upper layer in FIG. 5 is shorter than the length of the connector tape 117 in the next lower layer, which is shorter than the length of the connector tape 117 in the next lower layer. In other embodiments, some or all of those connector tapes 117 may have the same length.

Once the superconducting tapes 116 and connector tapes 117 are extended over the terminal body 118, the outer shell 120 is placed over the tapes and terminal body. In particular embodiments, the terminal body 118 (and tapes 116, 117) are inserted into the interior volume of the outer shell 120, through the opening 120a. In other embodiments, the outer shell 120 is formed in multiple pieces that are assembled over the terminal body 118 (and tapes 116, 117). Once the terminal body 118 (and tapes 116, 117) are arranged inside of the interior volume of the outer shell 120, solder 126 or other selectively flowable material is injected (or otherwise flowed) into the interior volume of the outer shell 120, to cover the tapes 116, 117 and fill the spaces between the terminal body 118 (and tapes 116, 117) and the inner surface of the outer shell 120. In particular embodiments, the solder 126 (or other selectively flowable material) is selected to provide a low-resistance current path between the tapes 116, 117 and the outer shell 120. In further particular embodiments, the solder 126 (or other selectively flowable material) has a higher melting (flow) temperature than the solder (or other flowable material) used for the butt joints 119.

In embodiments described above, the connecting tapes 117 include one or more superconducting layers 117b. In other embodiments, the connecting tapes 117 are normal electrically conductive tapes (or other normal electrical conductors) that have no superconducting materials, for example, but not limited to, tapes having normal electrically conductive layers, such as copper, gold, or other conductive metal or material. In other embodiments of the connector structure 110, the connecting tapes 117 are omitted and current transfer from the superconducting layer(s) 116a on the superconducting tapes 116, directly through the solder 119 (or other flowable material).

Also in embodiments described above, the terminal bodies 18 and 118 are made of (or coated with) a superconducting material. In other embodiments, the terminal bodies 18 and 118 are made of a normal electrically conductive metal or material. In yet further embodiments, the material of the terminal bodies 18 and 118 include a corrosion-resistive layer such as nickel or gold.

The connector structures in FIGS. 6-16 are configured in a manner similar to the configurations and processes described above with respect to the embodiments of FIGS. 1-5, however, with certain components shaped different from the shapes described and shown with respect to FIGS. 1-5. Accordingly, the descriptions of related components and processes provided above are employed, where applicable, for the embodiments of FIGS. 6-16.

A female connector structure 210 according to another embodiment of the present invention is described with reference to FIGS. 6 and 7. The female connector structure 210 is configured to electrically connect with a male connector structure 10 (described above), as shown in FIG. 7.

The female connector structure 210 is configured to connect to a superconducting cable 212 having superconducting tapes 216 wound around a former 214. The superconducting cable 212, former 214 and superconducting tapes 216 are configured in the same manner as described above with respect to superconducting cable 12, former 14 and tapes 16. The female connector structure 210 includes an outer shell 220, a terminal body 230, seal(s) 222, seal(s) 224 in an opening 220a of the outer shell 220, and solder 226 or other selectively flowable material, similar to the shell 20, terminal body 18, seals 22 and 24, and solder 26 or other flowable material described above with respect to the male connector structure 10. However, the terminal body 230 has a shape that is different from the terminal body 18 described above.

In particular, the terminal body 230 has a recess 230b with an opening and interior volume that are coaxially arranged within an opening 220b of the shell 220. The opening and interior volume of the recess 230b each have a shape and a size suitable for receiving the extended portion of the terminal body 18 of the male connector structure 10, as shown in FIG. 7, to make an electrical connection between the terminal bodies 230 and 30 (and, thus, between the superconducting cables 212 and 12).

Figure 6:
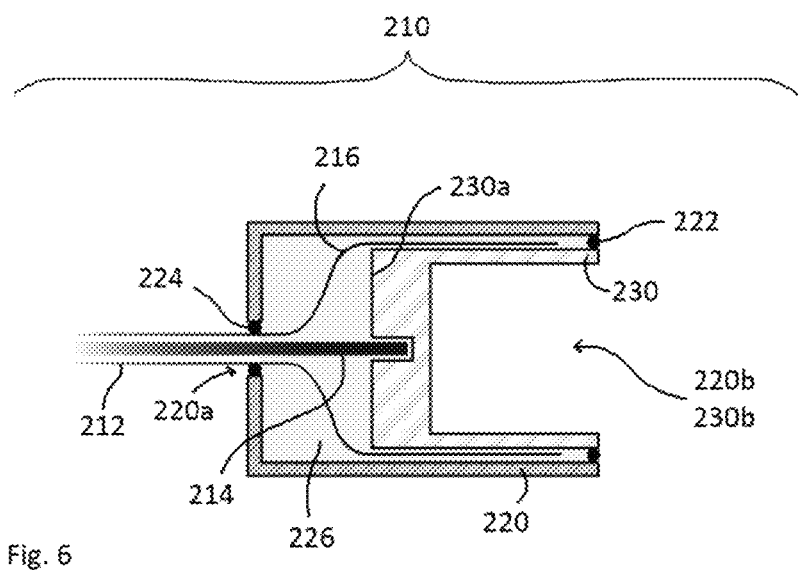
FIG. 6 is a side, cross-section view of a female connector according to an embodiment of the present invention.
Figure 7:
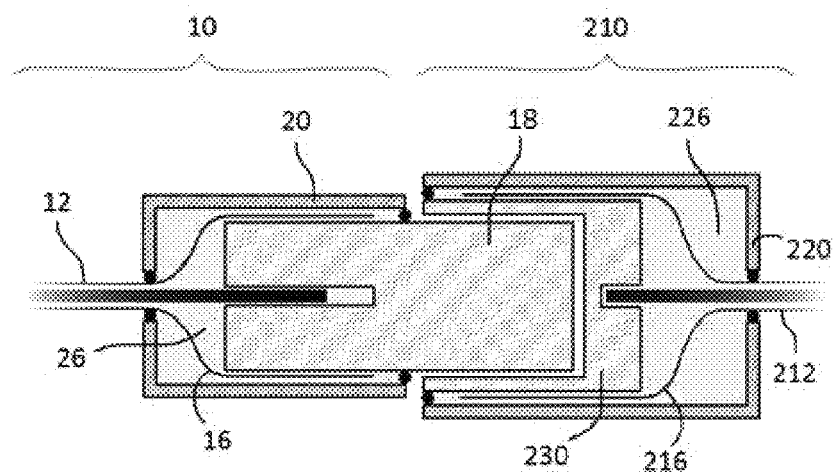
FIG. 7 is a side, cross-section view of the male connector of FIGS. 1-3 being connected with the female connector of FIG. 6.
Figure 8:
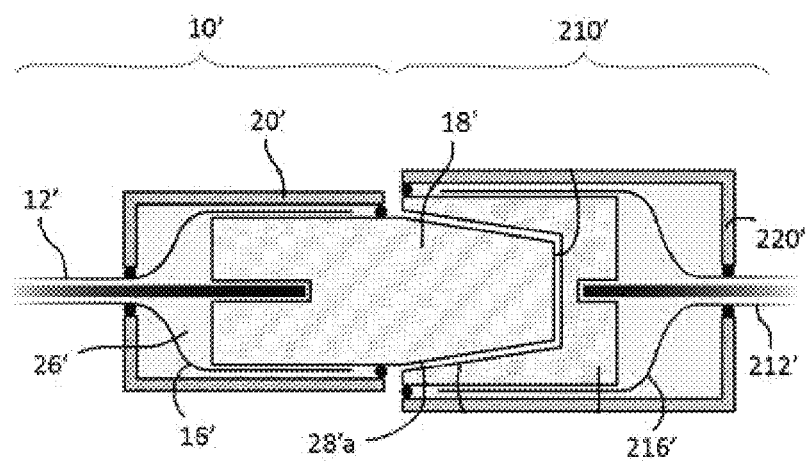
FIG. 8 is a side, cross-section view of another embodiment of a male connector being connected with a female connector.

In the embodiment shown in FIGS. 6 and 7, the terminal body 230 has a cup-shaped configuration, with a generally cylindrical outer surface and a generally cylindrical-shaped recess 230b. In other embodiments, other suitable shapes for the terminal body 230 and/or the recess 230b are employed. For example, in further embodiments as shown in FIG. 8 (where reference numbers corresponding to the embodiment of FIG. 7 are used, but with a prime' symbol, to represent corresponding parts to that embodiment), the outer shape of the terminal body 230' and/or the shape of the recess is tapered and/or generally conical. In particular embodiments in which the recess has a tapered and/or conical shape, the recess has a larger diameter toward the opening 220b and a smaller diameter toward the rear surface 230a of the terminal body 230. In such embodiments, the shape of the extended portion of the terminal body 18 of the male connector structure can be formed with a corresponding tapered, conical or other shape that matches the shape of the recess 230b in the female connector structure. In particular embodiments, the inner surface of the recess 230b and/or the outer surface of the extended portion of the terminal body 18 are made of or coated with a corrosion-resistant material, such as, but not limited to nickel or gold.

The male connector structure 10 (10') is electrically coupled with the female connector structure 210 (210'), by aligning the extended portion of the terminal body 18 of the male connector structure with the opening 220b, 230b in the female connector structure, and then applying a suitable force on one or both of the male and female connector structures to bring those connector structures together. As the connector structures are brought together, the extended portion of the terminal body 18 is inserted into the interior volume of the terminal body 230 a sufficient distance to make electrical contact between the terminal bodies 18 and 230. In particular embodiments, the extended portion of the terminal body 18 is inserted into the interior volume of the terminal body 230 as far as possible, for example, until an end surface of the terminal body 18 makes contact with an interior end surface of the interior volume of the terminal body 230.

In further embodiments, the electrical contact between the male and female connector structures 10 and 210 is further improved by using a clamping mechanism or bolts that press the connector structures 10 and 210 together in the axial direction (i.e., the horizontal direction in FIGS. 7 and 8). When the connector structures 10 and 210 are coupled together, electrical current flows from the superconducting tapes in the cable 12 on the male connector structure side, through the solder 26, through the male terminal body 18, through the female terminal body 230, through the solder 226 and into the superconducting tapes in the cable 212 on the female connector structure side. Alternatively, current may flow in the opposite direction (from the female connector structure side to the male connector structure side).

Figure 9:
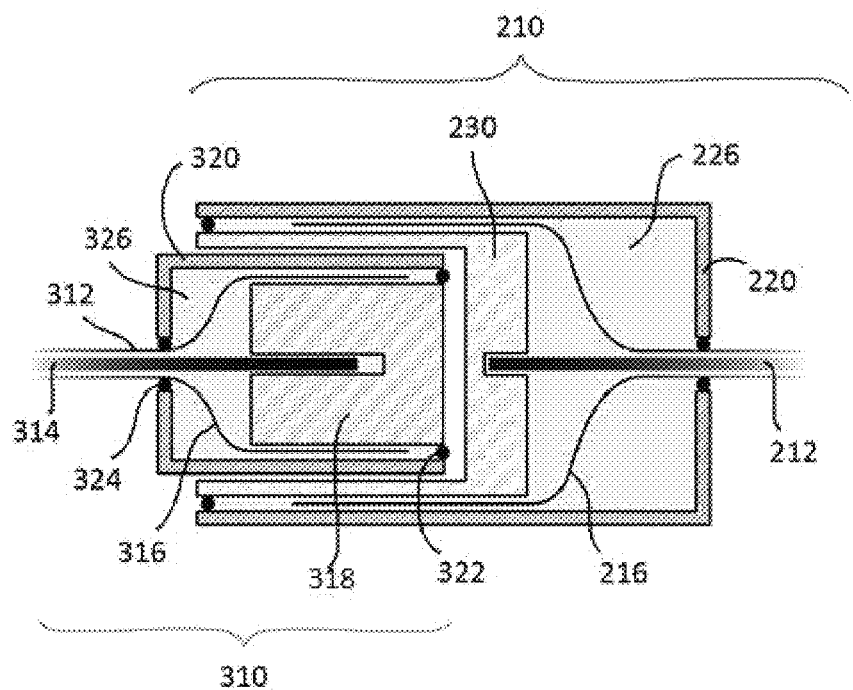
FIG. 9 is a side, cross-section view of another embodiment of a male connector being connected with the female connector of FIG. 6.

A further embodiment of a male connector structure 310 is shown in FIG. 9. The male connector structure 310 is configured to electrically couple with a female connector structure 210 (described above), as shown in FIG. 9.

The male connector structure 310 is configured to connect to a superconducting cable 312 having superconducting tapes 316 wound around a former 314. The superconducting cable 312, former 314 and superconducting tapes 316 are configured in the same manner as described above with respect to superconducting cable 12, former 14 and tapes 16. The male connector structure 310 includes an outer shell 320, a terminal body 330, seal(s) 322, seal(s) 324, and solder 326 or other selectively flowable material, similar to the shell 20, terminal body 18, seals 22 and 24, and solder 26 or other flowable material described above with respect to the male connector structure 10. However, the terminal body 330 has a shape that is different from the terminal body 18 described above. In particular, the terminal body 330 has a shorter length (relative to the length of the outer shell 320), than that of terminal body 18, and does not extend much (or at all) from the open end of the outer shell 320.

In addition, the embodiment of FIG. 9, the outer diameter of the outer shell 320 of the male connector structure 310 and the inner diameter of the interior volume of the terminal body 230 in the female connector structure 210 are configured (in size and shape) to allow the outer shell 320 to fit within the interior volume of the terminal body 230 (i.e., to pass through the opening 230b and enter the interior volume of the terminal body 230). In particular embodiments, the entire outer shell 320 of the male connector structure 310 (or a substantial portion of the outer shell 320) is received within the interior volume of the terminal body 230, when the male and female connector elements 310 and 210 are connected. In particular embodiments, the outer shell 320 of the male connector structure 310 is made of a material having a relatively high electrical conductivity, such as, but not limited to copper, or other suitable electrically conductive material.

Figure 10:
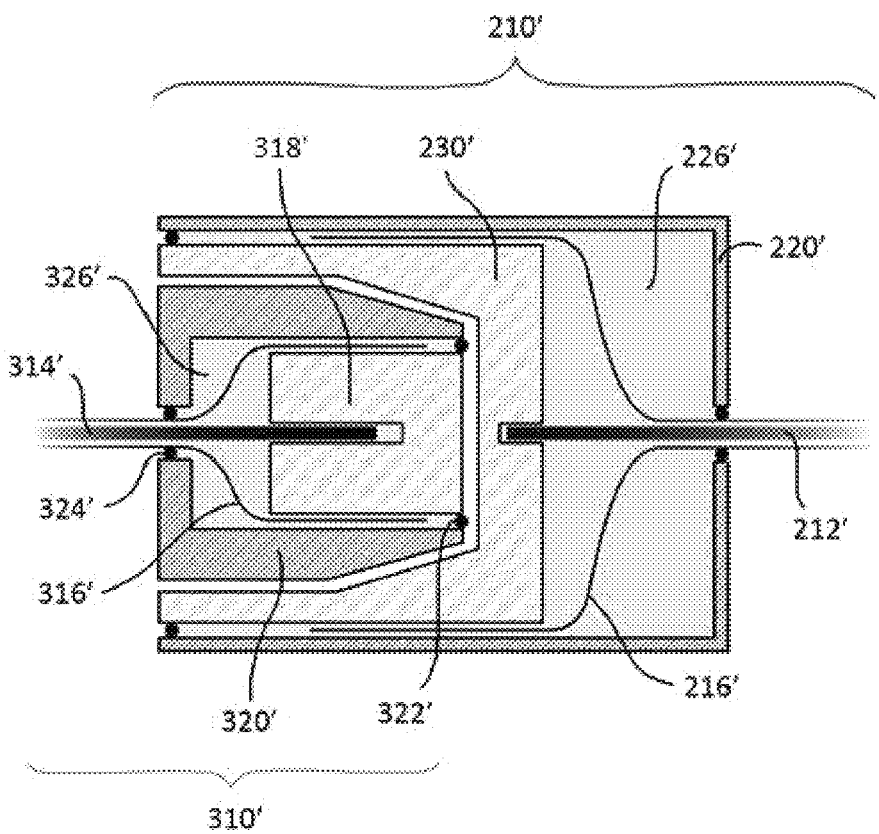
FIG. 10 is a side, cross-section view of another embodiment of a male connector being connected with a female connector.

In the embodiment shown in FIG. 9, the terminal body 230 of the female connector structure 210 has a cup-shaped configuration, with a generally cylindrical outer surface and a generally cylindrical-shaped recess 230b (FIG. 6), and the outer shell 320 of the male connector structure has a corresponding cylindrical shape. In other embodiments, other suitable shapes for the outer shell 320, and the terminal body 230 and/or the recess 230b are employed. For example, in further embodiments as shown in FIG. 10 (where reference numbers corresponding to the embodiment of FIG. 9 are used, but with a prime' symbol, to represent corresponding parts to that embodiment), the shape of the recess in the terminal body 230' is tapered and/or generally conical. In addition, the shape of the outer shell 320 of the male connector structure is formed with a corresponding tapered, conical or other shape that matches the shape of the recess in the female connector structure. In particular embodiments, the inner surface of the recess in the terminal body 230 (230') and/or the outer surface of the outer shell 320 (320') are made of or coated with a corrosion-resistant material, such as, but not limited to nickel or gold.

The male connector structure 310 (310') is electrically coupled with the female connector structure 210 (210'), by aligning the outer shell 320 of the male connector structure with the opening 220b, 230b in the female connector structure, and then applying a suitable force on one or both of the male and female connector structures to bring those connector structures together. As the connector structures are brought together, the outer shell 320 of the male connector structure is inserted into the interior volume of the terminal body 230 of the female connector structure a sufficient distance to make electrical contact between the outer shell 320 and the terminal body 230. In particular embodiments, the outer shell 320 of the male connector structure is inserted into the interior volume of the terminal body 230 as far as possible, for example, until an end surface of the outer shell 320 makes contact with an interior end surface of the interior volume of the terminal body 230.

When the connector structures 310 and 210 are coupled together, electrical current could flow from the superconducting tapes in the cable 312 on the male connector structure side, through the solder 326, through the male terminal body 318, through the outer shell 320, through the female terminal body 230, through the solder 226 and into the superconducting tapes in the cable 212 on the female connector structure side. Alternatively or in addition, current could flow from the superconducting tapes in the cable 312 on the male connector structure side, radially outward through he solder 326, directly through the outer shell 320, through the female terminal body 230, through the solder 226 and into the superconducting tapes in the cable 212 on the female connector structure side. Alternatively, current may flow in the opposite direction (from the female connector structure side to the male connector structure side).

In further embodiments, the electrical contact between the male and female connector structures 310 and 210 is further improved by using a clamping mechanism or bolts that press the connector structures 310 and 210 together in the axial direction (i.e., the horizontal direction in FIG. 9), as discussed above with respect to the embodiments of FIGS. 7 and 8.

Figure 11:
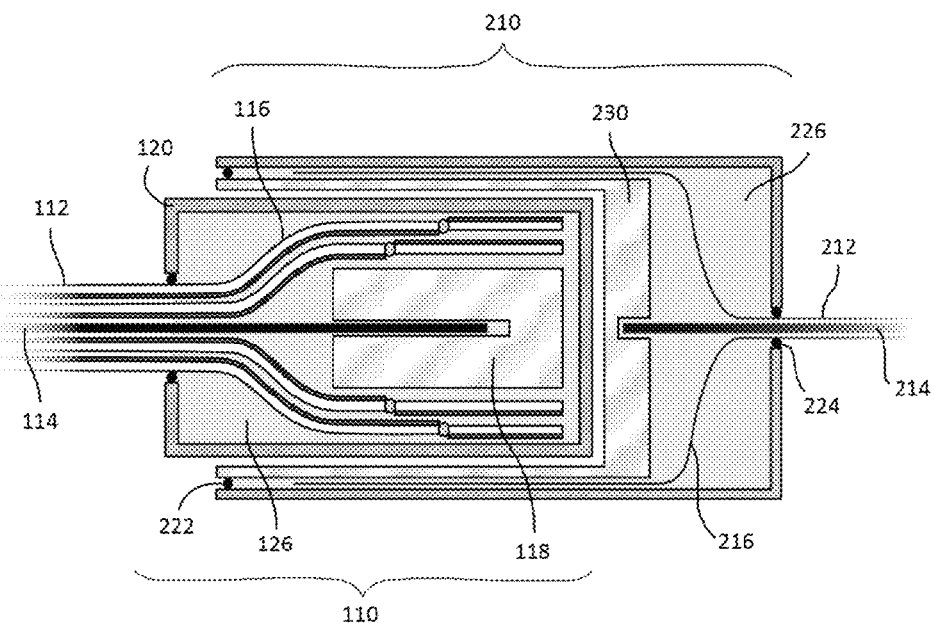
FIG. 11 is a side, cross-section view of the male connector of FIG. 5 being connected with the female connector of FIG. 6.

In FIG. 11, a further embodiment is shown in which a male connector structure 110 (similar to that described above with respect to FIGS. 4 and 5) is configured to electrically couple with a female connector structure 210 (similar to that described above with respect to FIG. 6). Corresponding reference numbers are used in FIG. 11 to identify corresponding parts described above with respect to FIGS. 4-6.

In the embodiment of FIG. 11, the outer diameter of the outer shell 120 of the male connector structure 110 and the inner diameter of the interior volume of the terminal body 230 in the female connector structure 210 are configured (in size and shape) to allow the outer shell 120 to fit within the interior volume of the terminal body 230 (i.e., to pass through the opening 230b and enter the interior volume of the terminal body 230). In particular embodiments, the entire outer shell 120 of the male connector structure 110 (or a substantial portion of the outer shell 120) is received within the interior volume of the terminal body 230, when the male and female connector elements 110 and 210 are connected. In particular embodiments, the outer shell 120 of the male connector structure 110 is made of a material having a relatively high electrical conductivity, such as, but not limited to copper, or other suitable electrically conductive material. In further embodiments, the outer shell 120 and/or the inner surface of the recess 230a in the terminal body 230 are coated with a corrosion-resistant coating, such as nickel or gold.

In the embodiment shown in FIG. 11, the terminal body 230 of the female connector structure 210 has a cup-shaped configuration, with a generally cylindrical outer surface and a generally cylindrical-shaped recess 230b (FIG. 6), and the outer shell 120 of the male connector structure has a corresponding cylindrical shape. In other embodiments, other suitable shapes for the outer shell 120, and the terminal body 230 and/or the recess 230b are employed, including, but not limited to tapered and/or conical shapes as described above with respect to terminal body 230' and outer shell 320' in FIG. 10.

The male connector structure 110 is electrically coupled with the female connector structure 210, by aligning the outer shell 120 of the male connector structure with the opening 220b, 230b in the female connector structure, and then applying a suitable force on one or both of the male and female connector structures to bring those connector structures together. As the connector structures are brought together, the outer shell 120 of the male connector structure is inserted into the interior volume of the terminal body 230 of the female connector structure a sufficient distance to make electrical contact between the outer shell 120 and the terminal body 230. In particular embodiments, the outer shell 120 of the male connector structure is inserted into the interior volume of the terminal body 230 as far as possible, for example, until an end surface of the outer shell 120 makes contact with an interior end surface of the interior volume of the terminal body 230.

When the connector structures 110 and 210 are coupled together, electrical current flows from the superconducting tapes in the cable 112 on the male connector structure side, radially outward through the solder 126 and the outer shell 120, through the female terminal body 230, through the solder 226 and into the superconducting tapes in the cable 212 on the female connector structure side. Alternatively, current may flow in the opposite direction (from the female connector structure side to the male connector structure side).

In further embodiments, the electrical contact between the male and female connector structures 110 and 210 is further improved by using a clamping mechanism or bolts that press the connector structures 110 and 210 together in the axial direction (i.e., the horizontal direction in FIG. 10), as discussed above with respect to the embodiments of FIGS. 7 and 8.

Figure 12:
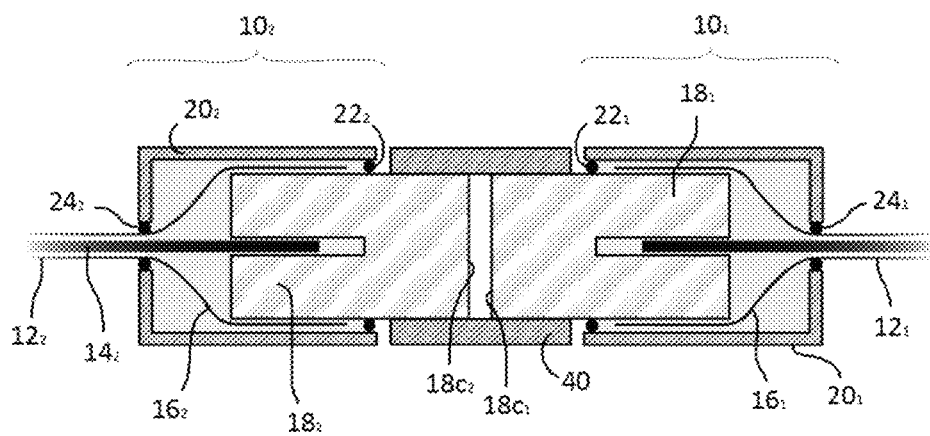
FIG. 12 is a side, cross-section view of two male connectors of FIGS. 1-3 connected together.

In FIG. 12, a further embodiment is shown in which two male connector structure $10_1$ and $10_2$ (each similar to that described above with respect to FIGS. 1-3) are configured to electrically couple together. Corresponding reference numbers are used in FIG. 12 to identify corresponding parts described above with respect to FIGS. 1-3.

In the embodiment of FIG. 12, at least one connection member 40 connects the extended portion of the terminal body $18_1$ (of the male connector structure $10_1$) with the extended portion of the terminal body $18_2$ (of the male connector structure $10_2$). In particular embodiment, the connection member 40 comprises a pair of half shell members that fit at least partially around and contact the diameter of the extended portions of the terminal bodies $18_1$ and $18_2$. In other embodiments, the connection member 40 has more than two shell members that fit at least partially around the terminal bodies $18_1$ and $18_2$. In yet other embodiments, the connection member 40 is configured with a single shell member that fits at least partially around the terminal bodies $18_1$ and $18_2$. In particular embodiments, the shells of the connection member 40 are clamped together (or provide a clamping force in the radial direction) to retain the shells on the terminal bodies $18_1$ and $18_2$. In such embodiments, the clamping force may be provided by any suitable mechanism, including, but not limited to a natural spring force of the shells of the connection member 40, an external band or other external clamping structure (not shown), or the like. In particular embodiments, the connection member 40 allows for some degree of axial movement (in the horizontal direction of FIG. 12) of one or both of the male connector structures $10_1$ and $10_2$.

The shells of the connection member 40 are made of any suitable electrically conductive material (such as, but not limited to copper, or other suitable electrically conductive material), or superconducting material, or both. In further embodiments, the contacting surfaces of the connection member 40 and the terminal bodies $18_1$ and $18_2$ are made with or coated with a corrosion-resistant layer, such as, but not limited to, nickel, or gold.

Figure 13:
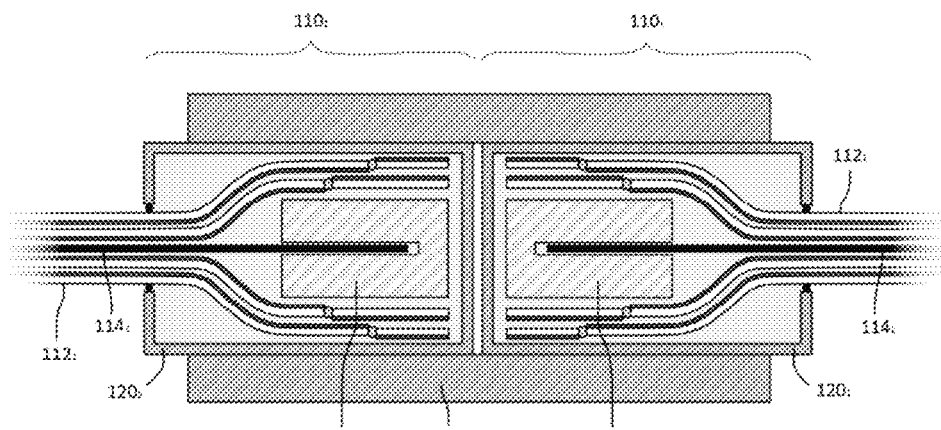
FIG. 13 is a side, cross-section view of two male connectors of FIG. 5 connected together.

In FIG. 13, a further embodiment is shown in which two male connector structure $110_1$ and $110_2$ (each similar to that described above with respect to FIGS. 4 and 5) are configured to electrically couple together. Corresponding reference numbers are used in FIG. 13 to identify corresponding parts described above with respect to FIGS. 4 and 5.

In the embodiment of FIG. 13, at least one connection member 50 connects the outer shell $120_1$ (of the male connector structure $110_1$) with the outer shell $120_2$ (of the male connector structure $110_2$). In particular embodiment, the connection member 50 comprises a pair of half shell members that fit at least partially around and contact the diameter of each outer shell $120_1$ and $120_2$. In further embodiments, the connection member 50 comprises one shell or more than two shells, each of which is configured and operates similar to the shells 40 described above.

Figure 14:
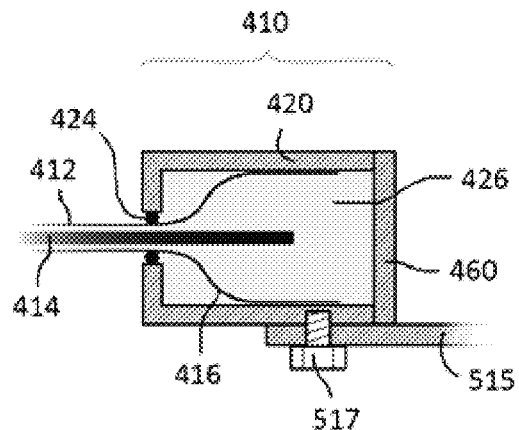
FIG. 14 is a side, cross-section view of a connector connecting a superconducting cable to a current lead.
Figure 15:
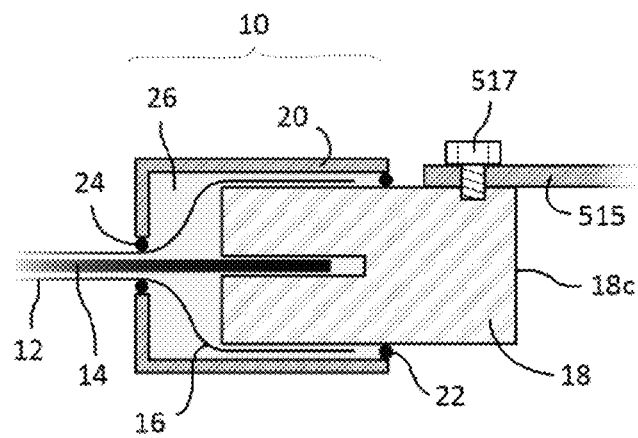
FIG. 15 is a side, cross-section view of the male connector of FIGS. 1-3 connecting a superconducting cable to a current lead.
Figure 16:
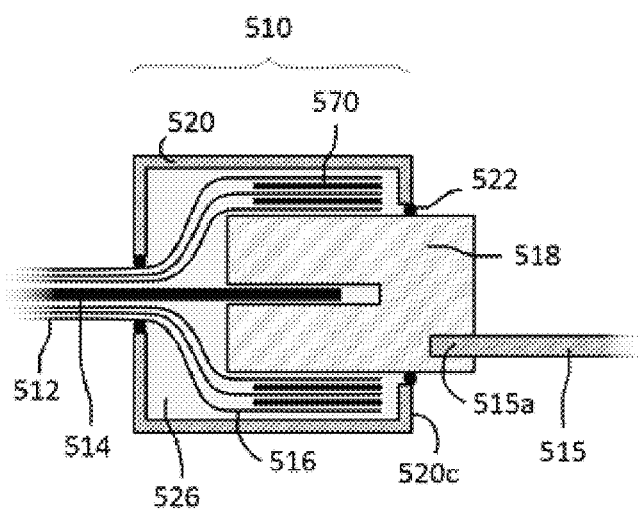
FIG. 16 is a side, cross-section view of the male connector of FIG. 5 connecting a superconducting cable to a current lead.

In the embodiments of FIGS. 14-16, a connector structure is electrically connected to a superconducting cable on one end and a normally conducting, or superconducting current lead on another end. In particular embodiments, such connector structures provide a low resistance current path from a superconducting cable to a current lead.

An embodiment of a connector structure 410 that connects a superconducting cable 412 (having superconducting tapes 416 wound on a former 414) to a current lead 515 is shown in FIG. 14. The superconducting cable 412, former 414 and superconducting tapes 416 are configured in the same manner as described above with respect to superconducting cable 12, former 14 and tapes 16. The connector structure 410 includes an outer shell 420, seal(s) 424, and solder 426 or other selectively flowable material, similar to the shell 20, seals 24, and solder 26 or other flowable material described above with respect to the male connector structure 10. The outer shell 420 is made of any suitable electrically conductive material, including, but not limited to copper, gold or other electrically conductive material.

However, unlike the male connector structure 10, the connector structure 410 in FIG. 14 does not have to include a terminal body (e.g, terminal body 18 in FIGS. 1-3). Instead, the end portions of the superconducting tapes 416 that spiral off of the former 414, are attached to, or pressed against an inner surface of the outer shell 420. In particular embodiments, the inner surface of the outer shell 420 has a diameter that is sufficiently larger than the diameter of the former 414, to allow the end portions of the superconducting tapes 416 to spread apart as they transfer from the former 414 to the larger diameter surface of the outer shell 420. Once the end portions of the superconducting tapes 416 are spread out within the outer shell 420 (and/or are attached to the inner surface of the outer shell 420), the outer shell 420 is filled with solder (or other selectively flowable electrically conductive material), to connect the tapes together and/or to outer shell 420. In other embodiments, the end portions of the superconducting tapes 416 are spread apart by only a minimum amount (or not at all), but are surrounded by a conductive material such as, but not limited to solder, pre-tinned solder, copper plating, or other suitable conductive material. A cap 460 may be connected to the outer shell 420, to close the outer shell 420, to help retain the solder (or other selectively flowable material) within the outer shell 420. The cap 460 may be connected to the outer shell 420 by any suitable connection mechanism, including, but not limited to one or more of solder, other selectively flowable material or adhesive, screws, bolts, clamps, or the like.

In addition, one or more current leads 515 is connected to the outer shell 420, or cup 460 by any suitable connection mechanism. In the embodiment of FIG. 14, a current lead 515 is connected to the outer shell 420 by a threaded screw or bolt 517. In other embodiments, other suitable connection mechanisms are employed to connect the current lead 515 to the outer shell 420, or cup 460, including, but not limited to one or more of solder, other selectively flowable material or adhesive, clamps, or the like.

In the embodiment of FIG. 15, a male connector structure 10 (as described above with respect to FIGS. 1-3) is connected to one or more current leads 515. Reference is made to the description of the connector structure 10 in FIGS. 1-3. In FIG. 15, a current lead 515 is connected to the extended portion of the terminal body 18 by a threaded screw or bolt 517. In other embodiments, other suitable connection mechanisms are employed to connect the current lead 515 to the terminal body 18, including, but not limited to one or more of solder, other selectively flowable material or adhesive, clamps, or the like. In the embodiment of FIG. 15, current may flow from the superconducting tapes 16 of the superconducting cable 12, through the terminal body 18, to the current lead(s) 515. In further embodiments, current may flow in the opposite direction (i.e., from the current lead(s) 515 to the superconducting cable 12).

The embodiment of FIG. 16 is similar to the embodiment of FIG. 15. In FIG. 15, the superconducting cable 512, former 514 and superconducting tapes 516 are configured in the same manner as described above with respect to superconducting cable 12, former 14 and tapes 16. The male connector structure 510 includes an outer shell 520, a terminal body 518, seal(s) 522, seal(s) 524, and solder 526 or other selectively flowable material, similar to the shell 20, terminal body 18, seals 22 and 24, and solder 26 or other flowable material described above with respect to the male connector structure 10.

However, the outer shell 520 in FIG. 16 may have a further side or lip 520c that allows the outer shell 520 to have a larger inner diameter (and/or allows the terminal body 518 to have a smaller outer diameter) than the embodiment of FIG. 15. As a result, additional space is provided within the interior volume of the outer shell 520, for further layers 570 of materials between or adjacent the end portions of the superconducting tapes 516 around the terminal body 518

In particular embodiments, the further layers 570 provide different contact resistances between the different layers of superconducting tapes 516 and terminal body 518. In such embodiments, the further layers 570 are composed of cylinders, or sheaths made from conductive or resistive materials that are placed over the superconducting tapes 516, between each layer, at the terminal body 518. Current flowing from the terminal body must flow through the cylinders, and the effective contact resistance increases for each layer of superconducting tapes located further away from the former in the cable. This configuration can provide a better current penetration into the inner most layers of the cable when operated at high current ramp rates. The resistance of each intermediate cylinder can be selected or changed by selecting or changing the thickness of the cylinder, or by selecting or changing the materials from which the cylinders are made.

Figure 17:
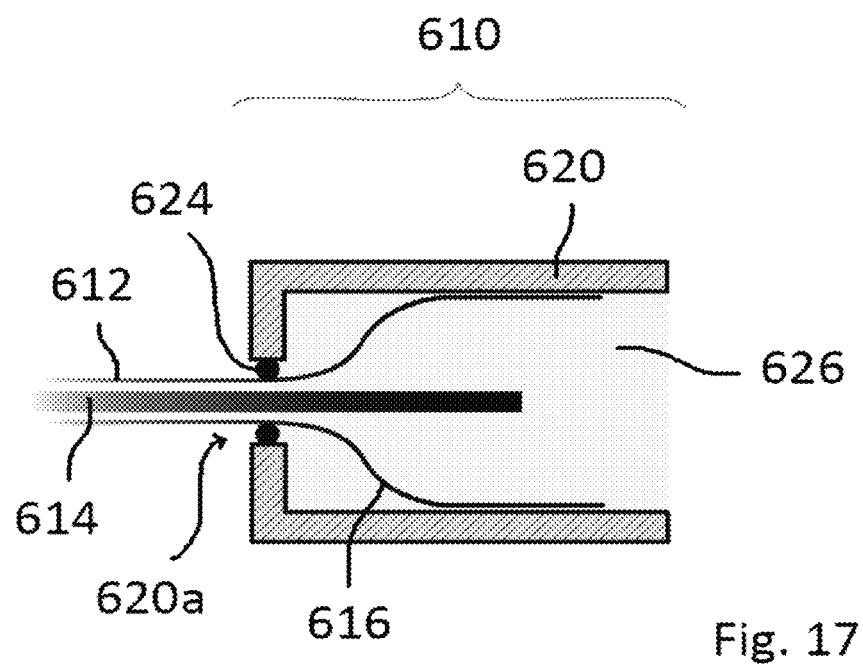
FIG. 17 is a side, cross-section view of a male connector according to a further embodiment of the present invention.
Figure 18:
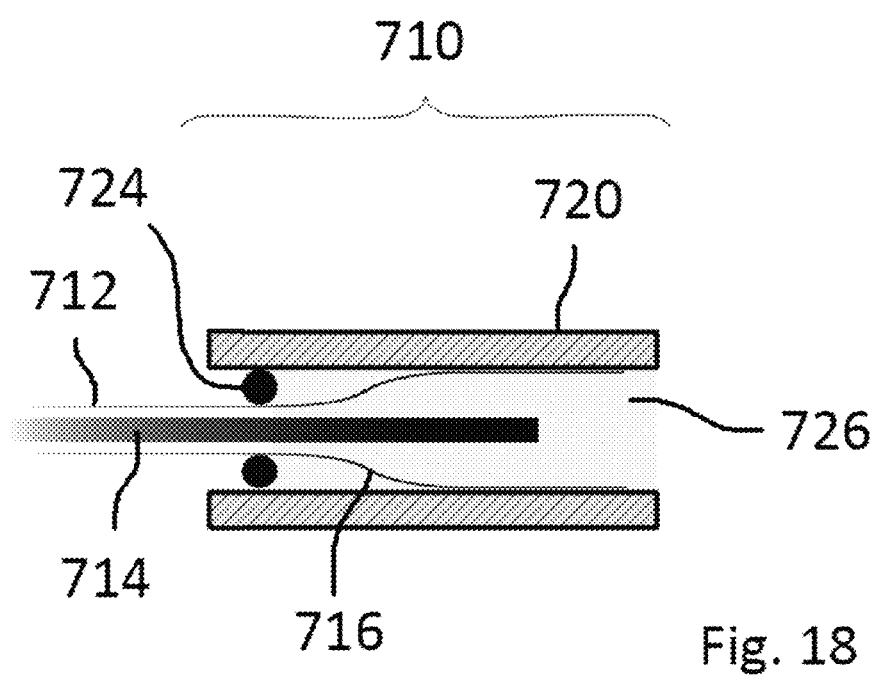
FIG. 18 is a side, cross-section view of a male connector according to a further embodiment of the present invention.

Male connector structures 610 and 710 according to further embodiments are shown in FIGS. 17 and 18. The male connector structure 710 is similar to the male connector structure 610, but has a thinner outer diameter than the male connector 610. In particular embodiments, the outer diameter of the male connector structure 710 may be similar or slightly larger than the diameter of the cable 712.

The male connector structures 610 and 710 may be similar to the male connector structure 110 in FIG. 5, but without connector tapes and a terminal body. In addition, the male connector structures 610 and 710 may also be similar to the connector structure in FIG. 14, but without the leads 515 and end cap 460.

Figure 19:
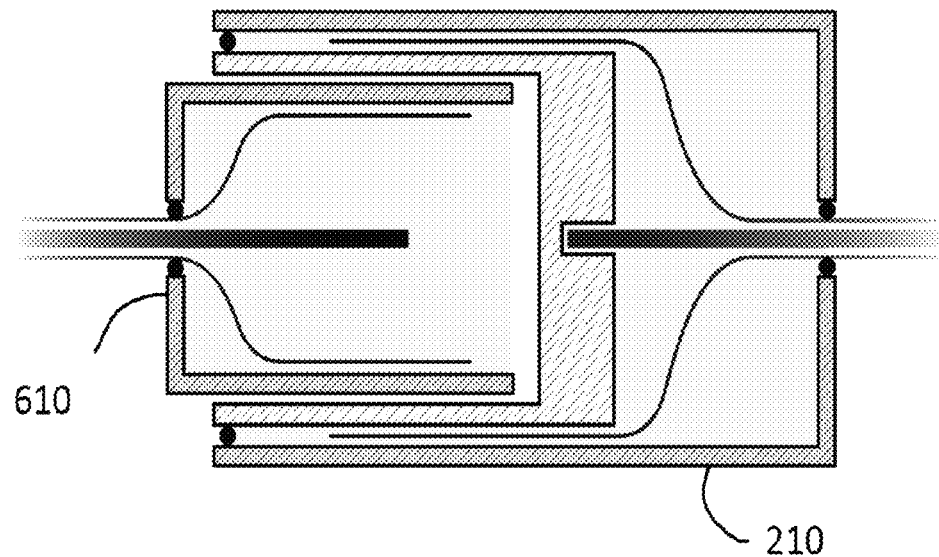
FIG. 19 is a side, cross-section view of the male connector of FIG. 17 being connected with the female connector of FIG. 6

In particular embodiments, the male connector structures 610 and 710 are each configured to selectively connect with a female connector structure 210 as described herein (or other suitable female connector structure). An example of a male connector structure 710 (described above) electrically coupled with a female connector structure 210 (described above), as shown in FIG. 19. In other examples, a male connector structure 810 (described above) may be electrically coupled with a similar female connector structure that has a smaller inner diameter that more closely matches the outer diameter of the male connector structure 810.

The male connector structure 610 in FIG. 17 is configured to connect to a superconducting cable 612 having superconducting tapes 616 wound around a former 614. Similarly, the male connector structure 710 in FIG. 18 is configured to connect to a superconducting cable 712 having superconducting tapes 716 wound around a former 714. The superconducting cable 612 and 712, the former 614 and 714 and the superconducting tapes 616 and 716 are configured in the same manner as described above with respect to superconducting cable 12, former 14 and tapes 16 shown in FIG. 3.

The male connector structures 610 and 710 each include an outer shell 620 or 720 but no terminal body located within an outer shell. The outer shell 620 and 720 may be configured in the same manner and shape, and of the same materials as in the examples described above with respect to the outer shell 20.

In one embodiment, each outer shell 620 and 720 has one opening 620a or 720a through which the superconducting cable 612 or 712 extends (corresponding to the above-described opening 20a in FIG. 3), and a second opening 620b or 720b (corresponding to opening 20b in FIG. 3). In other embodiments, each outer shell 620 and 720 is closed at the end shown with the second opening 620b or 720b, for example, by a portion of the outer shell 620 or 720 (similar to the manner in which outer shell 120 closes the end of the connector structure 110 in FIG. 5) or by an end cap similar to end cap 460 in FIG. 14.

One or more seals 624 or 724 (similar to the seals 24 described above) may be arranged in the opening 620a or 720a, in a manner similar to the arrangement of the seal(s) 24 in the opening 20a, described above. The connector structures 610 and 710 each include solder 626 or 726 (or other selectively flowable electrically conductive material) within the interior volume of the outer shell 620 or 720, similar to the solder 26 or other flowable material described above with respect to the male connector structure 10. Each outer shell 620 and 720 is made of any suitable electrically conductive material, including, but not limited to copper, gold or other electrically conductive material.

However, unlike the male connector structure 10, the connector structure 610 in FIG. 17 and the connector structure 710 in FIG. 18 does not have to include a terminal body (e.g, terminal body 18 in FIGS. 1-3). Instead, the end portions of the superconducting tapes 616 or 716 spiral off of the former 614 or 714, and are attached to, or pressed against an inner surface of the outer shell 620 or 720, similar to the embodiment described above with respect to FIG. 14. In particular embodiments, the inner surface of the outer shell 620 or 720 has a diameter that is sufficiently larger than the diameter of the cable 612 or 712, to allow the end portions of the superconducting tapes 616 or 716 to spread apart as they transfer from the former 614 or 714 to the larger diameter surface of the outer shell 620 or 720. However, in other embodiments, the inner surface of the outer shell 620 or 720 has about the same diameter as the cable 612 or 712, or is slightly larger or slightly smaller in diameter than the cable 612 or 712. In those embodiments, the spreading out of the end portions of the superconducting tapes 616 or 716 can be minimized, where the tapes are surrounded and in contact with a conductive material, such as, but not limited to, a layer, plating or coating of electrically conductive material such as, but not limited to pre-tinned solder, copper, gold or the like. Once the end portions of the superconducting tapes 616 or 716 are within the outer shell 620 or 720 (and/or are attached to the inner surface of the outer shell 620 or 720), the outer shell 620 or 720 is filled with solder (or other selectively flowable electrically conductive material), to connect the tapes together and/or to outer shell 620 or 720. Alternatively or in addition, the pre-tinned solder is melted by heating the connector structure.

In the embodiments of FIGS. 17 and 18, current will flow from the tapes 616 or 716, radially outward through the solder 626 or 726, or through the outer shell 620 or 720 (or both). In such embodiments, by providing the superconducting tapes 616 or 716 (or at least the end portions of the superconducting tapes 616 or 716) with a resistive buffer layer in direct contact with superconducting film, and with an outer layer, plating or coating of conductive material as described above, each superconducting tape can be provided with a sufficient current flow path between the superconducting tapes, such that a terminal body is not needed. In such embodiments, the current flow outward in the radial direction is enhanced by the solder (or other flowable electrically conductive material) covering the superconducting tapes 616. In particular embodiments, the end portions of the superconducting tapes need not be spread out (or may only spread out by a relatively small amount), as the solder (or other flowable electrically conductive material) sufficiently enhances the current flow in the radial direction. However in other embodiments, the end portions of the superconducting tapes are spread out and apart from each other by a small amount can help with covering of the end portions of the superconducting tapes with solder (or other flowable electrically conductive material).

Figure 20:
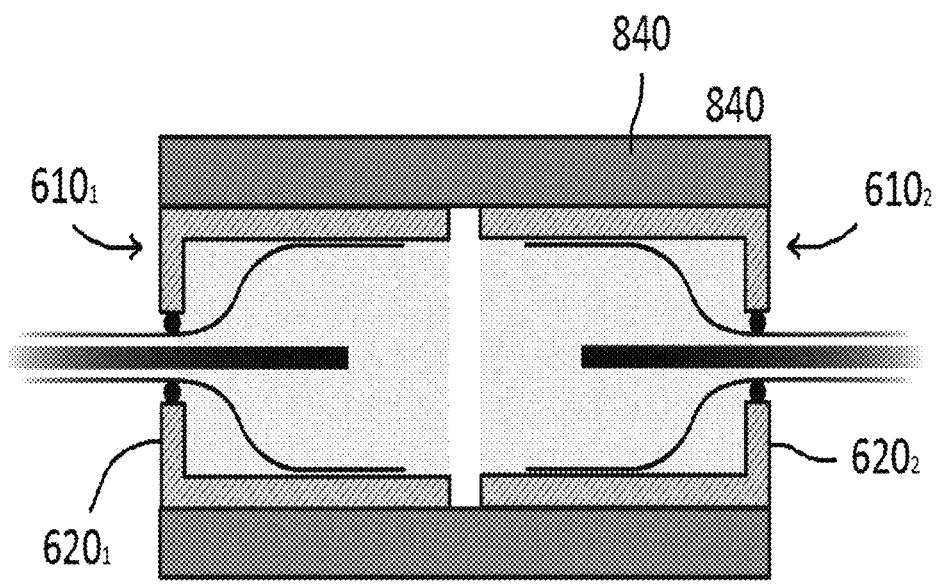
FIG. 20 is a side, cross-section view of two male connectors of FIG. 17 connected together.

In FIG. 20, a further embodiment is shown in which two male connector structure $610_1$ and $610_2$ (each similar to the male connector structure 610 described above with respect to FIG. 17) are configured to electrically couple together. Corresponding reference numbers are used in FIG. 20 to identify corresponding parts described above with respect to FIG. 17. In other embodiments, the two male connector structures shown in FIG. 20 may have a smaller diameter configuration (similar to the male connector 710 in FIG. 18).

In the embodiment of FIG. 20, at least one connection member 840 abuts the outer shell $620_1$ of the connector structure $610_1$ and the outer shell $620_2$ of the connector structure $610_1$ and electrically connects those outer shells together. In particular embodiment, the connection member 840 is configured similar to the connection member 40 discussed above with respect to FIG. 12, but is configured to abut the outer shells of the connector structures, instead of terminal bodies of connection structures. Accordingly, in particular embodiments, the connection member 840 comprises a pair of half shell members that fit at least partially around and contact the diameter of the outer shells $620_1$ and $620_2$.

In other embodiments, the connection member 480 has more than two shell members that fit at least partially around the outer shells $620_1$ and $620_2$. In yet other embodiments, the connection member 840 is configured with a single shell member that fits at least partially around the outer shells $620_1$ and $620_2$. In particular embodiments, the shells of the connection member 840 are clamped together (or provide a clamping force in the radial direction) to retain the shells on the outer shells $620_1$ and $620_2$. In such embodiments, the clamping force may be provided by any suitable mechanism, including, but not limited to a natural spring force of the shells of the connection member 840, an external band or other external clamping structure (not shown), or the like. In particular embodiments, the connection member 840 allows for some degree of axial movement (in the horizontal direction of FIG. 20) of one or both of the male connector structures $610_1$ and $610_2$.

The shells of the connection member 840 are made of any suitable electrically conductive or superconducting material, such as, but not limited to copper, or other suitable electrically conductive material. In further embodiments, the contacting surfaces of the connection member 840 and the outer shells $620_1$ and $620_2$ are made with or coated with a corrosion-resistant layer, such as, but not limited to, nickel, or gold.

Figure 21:
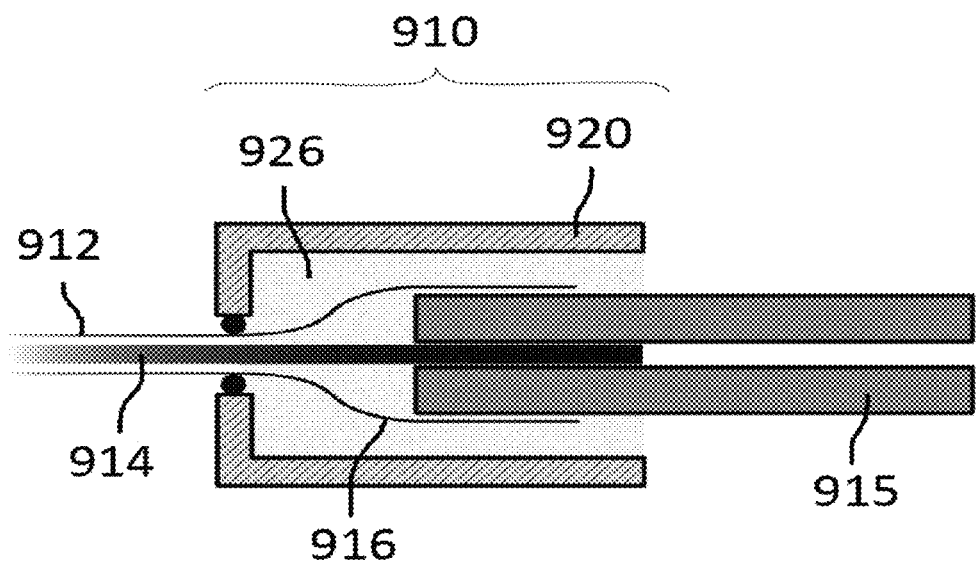
FIG. 21 is a side, cross-section view of a male connector of FIG. 17 connected to a superconducting lead.

A further connection structure is shown FIG. 21, wherein the end portions of the superconducting tapes are adhered to or electrically connected to (or both) the outer surface of a current lead.

In the embodiment of FIG. 21, the connector structure 910 is similar to the male connector structure 610 (or 710) described above, but has an end portion of a current lead 915 received within the interior volume of its outer shell 920. In addition, the end portions of the superconducting tapes 916 are adhered to and electrically connected to the outer surface of current lead 915. The connector structure 910 includes an outer shell 920 and solder (or other flowable material) 626, similar to the outer shell 20 and solder (or other flowable material) 26 described above.

In particular embodiments, the outer dimension of the current lead 915 is sufficiently greater than the diameter of the former 914 of the cable 912, such that the end portions of the superconducting tapes 916 are spread apart as they transfer from the former 914 to the larger diameter surface of the current lead 915. In other embodiments, the outer dimensions of the current lead 915 is about the same or slightly larger than (or smaller than) the diameter of the former 914, such that minimal or no spreading is achieved.

In the embodiment of FIG. 21, the former 914 is received within a central channel or opening in the current lead 915. In such embodiments, the former 914 may be fixed to the current lead 915 by solder or other conductive adhesive, or by mechanical connection such as, but not limited to a friction fit connection, or combinations thereof. In other embodiments, the former 914 attaches to the current lead 915 by solder or other conductive adhesive, mechanical connection, or combinations thereof, without being received within a channel or opening in the current lead 915. In particular embodiments, the current lead 915 may be a non-superconducting electrical conductor. In other embodiments, the current lead 915 may be a superconducting electrical conductor. For example, the current lead 915 may be a low-temperature superconducting wire or cable formed of superconducting material, such as, but not limited to NbTi or $Nb_3Sn$. Alternatively, the current lead 915 may be formed of a high-temperature superconducting cable, similar to cable 12 described above.

Figure 22:
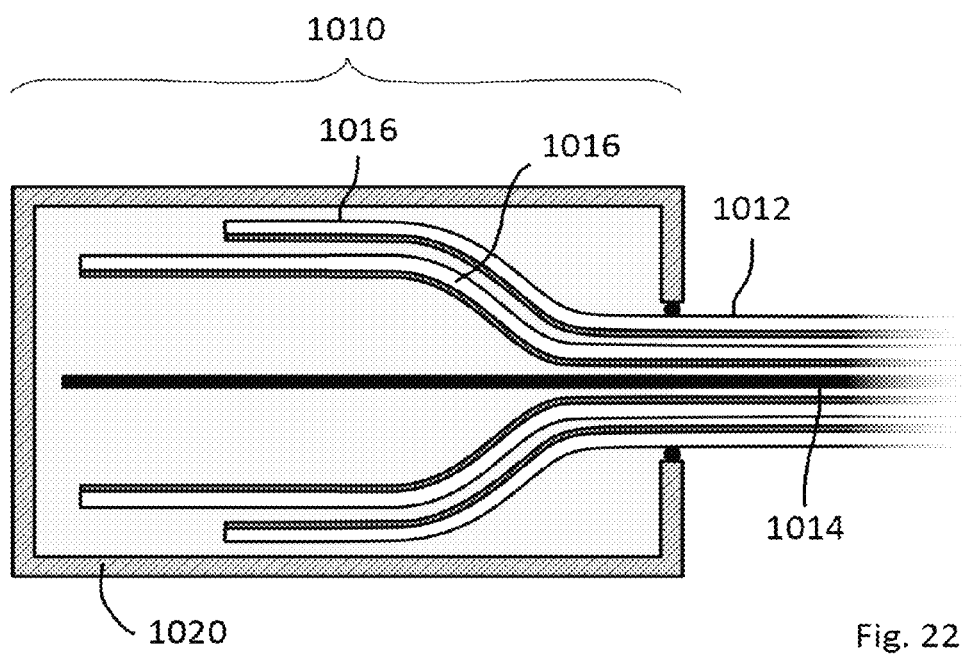
FIG. 22 is a side, cross-section view of a male connector according to a further embodiment of the present invention.

In any of the embodiments described above, some or all of the layers of superconducting tape conductors are tapered, such that, for example, end portions of the superconducting tapes in the outer layers (radially outward from the former) are shorter than the end portions of the superconducting tapes in the inner layers. An example of a male connector structure 1010 in FIG. 22 has a plurality of layers of superconducting tapes (each layer after the first layer on the former being located on or radially outward of an underlying layer). In the embodiment of FIG. 22, the male connector structure 1010 is similar to the male connector structure 610 (or 710) described above, but has a plurality of tapered layers of superconducting tapes. In the drawing of FIG. 22, the male connector structure 1010 is attached to a superconducting cable 1012 that has two layers of superconducting tapes 1016, where the end portions of those superconducting tapes are tapered. In other embodiments, the cable 1012 has more than two layers of superconducting tapes 1016 having tapered end portions (where the end portions of the inner layer(s) extend further into the outer shell 1020 than outer layer(s)). In particular embodiments, the tapering reduces the length of the current path through the solder from the inner tapes to the outer shell 1020, to reduce the contact resistance between the shell and the inner tapes.

Embodiments disclosed herein are to be considered in all respects as illustrative and not restrictive of the invention. The scope of the invention is indicated by the appended claims, rather than the foregoing description. All changes that come within the meaning and range of equivalency of the claims are therefore intended to be embraced therein.

What is claimed is:

1. A connector structure for a superconducting cable having a plurality of superconducting tapes wound around a former having a former diameter, the connector structure comprising:
   a terminal body having an outer surface with a diameter that is larger than the former diameter;
   a shell having an interior volume configured to contain at least a portion of the terminal body, the shell having an opening for receiving end portions of the superconducting tapes; wherein the end portions of the superconducting tapes are attached to, or located on the outer surface of the terminal body with one or more gaps formed between the end portions of the superconducting tapes attached to, or located on the outer surface of the terminal body;
   wherein a space is provided between the terminal body and the shell, within the interior volume of the shell, the connector structure further comprising a selectively flowable material provided within the space within the interior of the shell.

2. A connector structure as recited in claim 1, wherein the terminal body has a tapered or conical shape.

3. A connector structure as recited in claim 1, wherein the terminal body has a portion that extends out from the interior volume of the shell.

4. A connector structure as recited in claim 3, wherein the portion of the terminal body that extends out from the interior volume of the shell has a tapered or conical shape.

5. A connector structure as recited in claim 1, wherein the terminal body has a recess for receiving a portion of a male connector structure.

6. A connector structure as recited in claim 5, wherein the recess in the terminal body has a tapered or conical shape.

7. A connector structure as recited in claim 1, wherein the space between the terminal body and the shell is completely filled with the selectively flowable material.

8. A connector structure as recited in claim 1, wherein the selectively flowable material comprises electrically conductive solder.

9. A connector structure as recited in claim 1, wherein the terminal body is electrically connected to a normal conducting, or superconducting current lead.

10. A connector structure as recited in claim 1, wherein the terminal body includes a superconducting material or superconducting outer layer.

11. A connector structure as recited in claim 1, further comprising a respective superconducting connector tape coupled to the end portion of each respective superconducting tape, each superconducting connector tape having a superconducting layer facing in a direction opposite to a direction that a superconducting layer faces on the end portion of the superconducting tape connected thereto.

12. A connector structure as recited in claim 1, wherein the end portions of the superconducting tapes are tapered within the shell such that one or more superconducting tapes extends further into the shell than one or more other superconducting tapes of the plurality of superconducting tapes.

13. A method of making a connector structure for a superconducting cable having a plurality of superconducting tapes wound around a former having a former diameter, the method comprising:
providing a terminal body having an outer surface with a diameter that is larger than the former diameter;
containing the terminal body within an interior volume of a shell;
extending end portions of the superconducting tapes into the interior volume of the shell, through an opening within the shell;
attaching the end portions of the superconducting tapes to the outer surface of the terminal body with one or more gaps formed between the end portions of the superconducting tapes; and
providing a space between the terminal body and the shell, within the interior volume of the shell, and providing a selectively flowable material in the space within the interior of the shell.

14. A method as recited in claim 13, further comprising filling the gaps with a selectively flowable electrically conductive material.

15. A method as recited in claim 13, further comprising extending a portion of the terminal body out from the interior volume of the shell.

16. A method as recited in claim 15, wherein the portion of the terminal body that extends out from the interior volume of the shell has a tapered or conical shape.

17. A method as recited in claim 13, further comprising providing the terminal body with a recess for receiving a portion of a male connector structure.

18. A method as recited in claim 17, wherein the recess in the terminal body has a tapered or conical shape.

19. A method as recited in claim 13, wherein providing selectively flowable material in the space between the terminal body and the shell comprises completely filling the space with the selectively flowable material.

20. A method as recited in claim 13, wherein the selectively flowable material comprises electrically conductive solder.

21. A method as recited in claim 13, further comprising electrically connecting the terminal body to a normally conductive current lead.

22. A method as recited in claim 13, wherein the terminal body includes a superconducting material or superconducting outer layer.

23. A method as recited in claim 13, further comprising coupling a respective superconducting connector tape to the end portion of each respective superconducting tape, each superconducting connector tape having a superconducting layer facing in a direction opposite to a direction that a superconducting layer faces on the end portion of the superconducting tape connected thereto.

24. A method as recited in claim 13, further comprising tapering the end portions of the superconducting tapes within the shell by extending one or more superconducting tapes further into the shell than one or more other superconducting tapes of the plurality of superconducting tapes.

25. A connector structure for a superconducting cable having a plurality of superconducting tapes wound around a former having a former diameter, the connector structure comprising:
a shell having an interior volume and an opening for receiving end portions of the superconducting tapes into the interior volume, the shell having an interior surface bounding at least a portion of the interior volume;
wherein the end portions of the superconducting tapes are attached to, or located on the inner surface of the shell with one or more gaps formed between the end portions of the superconducting tapes attached to, or located on the inner surface of the shell.

26. A connector structure as recited in claim 25, wherein a selectively flowable material is provided within the interior volume of the shell, including around the end portions of the superconducting tapes.

27. A connector structure as recited in claim 26, wherein the interior volume of the shell is completely filled with the selectively flowable material and the end portions of the superconducting tapes.

28. A connector structure as recited in claim 26, wherein the selectively flowable material comprises electrically conductive solder.

29. A connector structure as recited in claim 25, wherein an electrically conductive material is provided within the one or more gaps and around the end portions of one or more of the superconducting tapes.

30. A connector structure as recited in claim 25, wherein the end portions of the superconducting tapes are tapered within the shell such that one or more superconducting tapes extends further into the shell than one or more other superconducting tapes of the plurality of superconducting tapes.

31. A method of making a superconducting cable having a plurality of superconducting tapes wound around a former having a former diameter, the connector structure comprising:
- providing a shell having an interior volume and an opening, the shell having an interior surface bounding at least a portion of the interior volume;
- receiving end portions of the superconducting tapes into the interior volume of the shell;
- attaching or locating the end portions of the superconducting tapes on the inner surface of the shell with one or more gaps formed between the end portions of the superconducting tapes attached to, or located on the inner surface of the shell.

32. A method as recited in claim 31, further comprising adding a selectively flowable material into the interior volume of the shell, including around the end portions of the superconducting tapes.

33. A method as recited in claim 32, wherein adding the selectively flowable material into the interior volume of the shell comprises completely filling the interior volume of the shell around the end portions of the superconducting tapes with the selectively flowable material.

34. A method as recited in claim 32, wherein the selectively flowable material comprises electrically conductive solder.

35. A method as recited in claim 31, further comprising tapering the end portions of the superconducting tapes within the shell by extending one or more superconducting tapes further into the shell than one or more other superconducting tapes of the plurality of superconducting tapes.

* * * * *